(12) United States Patent  
Ohira et al.

(10) Patent No.: US 10,921,429 B2  
(45) Date of Patent: Feb. 16, 2021

(54) OBSTACLE DETECTION DEVICE, MOVING BODY, AND OBSTACLE DETECTION METHOD

(71) Applicant: Sharp Kabushiki Kaisha, Sakai (JP)

(72) Inventors: Masakazu Ohira, Sakai (JP); Daisuke Tani, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 378 days.

(21) Appl. No.: 15/546,016

(22) PCT Filed: Jan. 26, 2016

(86) PCT No.: PCT/JP2016/052142  
§ 371 (c)(1),  
(2) Date: Jul. 25, 2017

(87) PCT Pub. No.: WO2016/121741  
PCT Pub. Date: Aug. 4, 2016

(65) Prior Publication Data  
US 2018/0024229 A1 Jan. 25, 2018

(30) Foreign Application Priority Data

Jan. 28, 2015 (JP) .............................. JP2015-014074

(51) Int. Cl.  
*G01S 7/48* (2006.01)  
*G01S 17/89* (2020.01)  
(Continued)

(52) U.S. Cl.  
CPC ............ *G01S 7/4808* (2013.01); *G01S 17/89* (2013.01); *G01S 17/931* (2020.01)

(58) Field of Classification Search  
CPC ..... G01S 17/936; G01S 17/989; G01S 7/4808  
See application file for complete search history.

(56) References Cited

U.S. PATENT DOCUMENTS 5,970,433 A * 10/1999 Oka .................. G01S 7/4811  
250/559.13  
2005/0036130 A1* 2/2005 Arita .................. G01S 17/936  
356/4.01  
(Continued)

FOREIGN PATENT DOCUMENTS

| CN | 103310428 A | 9/2013 |
| JP | 2006-285548 A | 10/2006 |
| JP | 2008-49932 A | 3/2008 |

OTHER PUBLICATIONS

Asvadi et al, 3D Lidar-based Static and Moving Obstacle Detection in Driving Environments: an approach based on voxels and multi-region ground planes, 2016. (Year: 2016).*

*Primary Examiner* — Regis J Betsch  
*Assistant Examiner* — Jeremy A Delozier  
(74) *Attorney, Agent, or Firm* — Keating & Bennett, LLP

(57) ABSTRACT

An obstacle detection device (10) is provided with a distance measurement sensor (11) which measures a detection distance to an object to be detected, a detection image generation unit (30*a*) which generates a detection image indicating a presence of the object to be detected in a detection range, based on a result of measurement by the distance measurement sensor (11), a rainfall determination unit (30*b*) which performs a rainfall determination of whether or not a region in the detection range is in a rainfall state, a rain removal processing unit (30*c*) which executes a rain removal process for removing the isolated points from the detection image, and an obstacle determination unit (30*d*) which performs an obstacle determination of whether or not the object to be detected is an obstacle. The obstacle determination unit (30*d*) performs the obstacle determination, based on the detection image on which the rain removal process is performed by the rain removal processing unit (30*c*), in a (Continued)

case where a region is determined to be in the rainfall state by the rainfall determination unit (30*b*).

17 Claims, 21 Drawing Sheets

(51) Int. Cl.
*G01S 17/93* (2020.01)
*G01S 17/931* (2020.01)

(56) References Cited

U.S. PATENT DOCUMENTS

| | | |
|---|---|---|
| 2013/0236116 A1 | 9/2013 | Kang et al. |
| 2015/0161457 A1* | 6/2015 | Hayakawa ............ G08G 1/166 348/46 |
| 2015/0186733 A1* | 7/2015 | Hayakawa ............ G08G 1/166 382/103 |
| 2016/0103208 A1* | 4/2016 | Heo ........................ G01S 17/89 702/159 |

\* cited by examiner

FIG. 17A

|   | 1 | 2 | 3 |
|---|---|---|---|
| A | 10m (A1) | 13m (A2) | 11m (A3) |
| B | 10m (B1) | 1m (B2) | 12m (B3) |
| C | 12m (C1) | 12m (C2) | 11m (C3) |

|   | 1 | 2 | 3 |
|---|---|---|---|
| A | 11m (A1) | 12m (A2) | 10m (A3) |
| B | 4m (B1) | 1m (B2) | 12m (B3) |
| C | 13m (C1) | 10m (C2) | 13m (C3) |

DT2, X, Y

OBSTACLE DETECTION DEVICE, MOVING BODY, AND OBSTACLE DETECTION METHOD

TECHNICAL FIELD

The present invention relates to an obstacle detection device that is provided with a distance measurement sensor which measures a distance to an object to be detected, a moving body, and an obstacle detection method and an obstacle detection program thereof.

BACKGROUND ART

In the related art, an automated driving system on a traveling surface controls its operation while detecting an obstacle by using a sensor or the like. For example, as a system for assisting a driver in a vehicle such as an automobile, a contact avoidance support device that supports evasive action to avoid contact with the obstacle has been developed (for example, refer to PTL 1).

In addition, a method has been proposed, which prevents a mobile robot from coming into contact with an obstacle by moving the mobile robot in a direction instructed by a remote operation, and calculating a moving speed based on a distance to the obstacle detected by a sensor (for example, refer to PTL 2).

CITATION LIST

Patent Literature

PTL 1: Japanese Unexamined Patent Application Publication No. 2008-49932
PTL 2: Japanese Unexamined Patent Application Publication No. 2006-285548

SUMMARY OF INVENTION

Technical Problem

A contact avoidance support device of a vehicle described in PTL 1 determines a distance to the obstacle in front of the vehicle by a front obstacle sensor, calculates a target speed of the vehicle according to the distance to the obstacle, controls a braking force based on the target speed, and reduces the vehicle speed by automatic brake. Accordingly, the contact avoidance support device urges a driver to avoid the contact with an obstacle without giving the driver discomfort. That is, the contact avoidance support device supports an evasive action intentionally performed by the driver, by adjusting the target speed in accordance with a state of the vehicle.

In addition, a mobile robot described in PTL 2 is provided with a detection unit detecting an obstacle in front of the mobile robot in a moving direction, calculates a distance to the obstacle, and receives instructions on a direction or a speed of movement by communicating with a monitor center. The mobile robot transmits an abnormal signal to the monitor center at the time of detecting the obstacle in front, in an automated moving mode. In the monitor center, a control staffer performs operations on the remote mobile robot. Also, the mobile robot in the remote operation mode moves at a traveling speed at which the mobile robot can be stopped before coming into contact with the obstacle, in accordance with instruction from the monitor center. The mobile robot to be used under such a remote operation mode moves at a moving speed, which is predetermined in consideration of delay of instruction due to transmission delay, so as to avoid contact with the obstacle.

However, a system of automated driving of the mobile robot, the vehicle, and the like, is used not only indoors but also outdoors, and thus coping with various environments is required. Changes of weather are considered in outdoors, and thus there is a problem in that raindrops and the like during rainfall are erroneously detected as an obstacle. In PTL 1 and PTL 2 described above, the erroneous detection of the raindrops and the like as the obstacle is not considered, and thus there is a problem in that the obstacle to avoid contact with and the raindrops and the like which do not disturb movement cannot be distinguished. In addition, a process of removing noise and the like from a detection result in order not to erroneously detect the raindrops and the like as the obstacle is proposed; however, if such a process is executed at a normal time, there is a concern that a small obstacle and the like are overlooked.

The invention has been made to solve above-described problems, and is to provide an obstacle detection device, which is capable of avoiding erroneous detection of a raindrop as an obstacle during rainfall, a moving body, an obstacle detection method, and an obstacle detection program.

Solution to Problem

The present invention provides an obstacle detection device including a distance measurement sensor that emits a detection wave to an object to be detected, receives a reflection wave from the object to be detected, and measures a detection distance to the object to be detected, a detection image generation unit that generates a detection image indicating a presence of the object to be detected in a detection range where the detection wave is emitted based on a result of measurement by the distance measurement sensor, a rainfall determination unit that performs a rainfall determination of whether or not a region in the detection range is in a rainfall state, based on a presence of isolated points, which are discretely positioned, among the objects to be detected in the detection image, a rain removal processing unit that executes a rain removal process for removing the isolated points from the detection image, and an obstacle determination unit that performs an obstacle determination of whether or not the object to be detected is an obstacle based on the detection image, in which, in a case where the rainfall determination unit determines that a region is in the rainfall state, the obstacle determination unit executes the obstacle determination based on the detection image on which the rain removal process is executed by the rain removal processing unit.

The obstacle detection device according to the invention, the detection range may be set to a three-dimensional space, the detection image generation unit may generate a three-dimensional image corresponding to the detection range, which is set to the three-dimensional space, as the detection image, and the rainfall determination unit may perform the rainfall determination on the three-dimensional image.

The obstacle detection device according to the invention, the rainfall determination unit may calculate a dispersion value of the object to be detected in the detection image at the time of the rainfall determination.

The obstacle detection device according to the invention, the rainfall determination unit may calculate a difference between peripheries of the object to be detected in the detection image and the detection distance thereof at the time of the rainfall determination.

The obstacle detection device according to the invention, the detection image generation unit may periodically generate the detection image at each of the generation cycles set in advance.

The obstacle detection device according to the invention, the rain removal processing unit may execute the rain removal process using a median filter.

The obstacle detection device according to the invention, the rainfall determination unit may perform the rainfall determination by comparing the detection image and a median process image in which the isolated point is removed from the detection image using the median filter.

The obstacle detection device according to the invention, the rainfall determination unit may perform the rainfall determination by comparing two detection images generated at different generation cycles.

The obstacle detection device according to the invention, the rainfall determination unit may perform the rainfall determination at each of a plurality of the generation cycles.

The obstacle detection device according to the invention, the rainfall determination unit may perform the rainfall determination at a plurality of the generation cycles, and output a result of the rainfall determination, at the time of continuously making the same determination many times.

The obstacle detection device according to the invention, the rain removal processing unit may remove the isolated point from the detection image by comparing the detection distances at each of a plurality of the generation cycles.

The present invention provides a moving body including the obstacle detection device according to the invention, and the moving body travels on a traveling surface.

The moving body according to the invention, further includes a traveling control unit that controls a traveling speed at which the moving body travels on the traveling surface, and the traveling control unit may perform control such that the traveling speed is reduced, in a case where the rainfall determination unit determines that a region is in the rainfall state.

The present invention provides an obstacle detection method of an obstacle detection device including a distance measurement sensor that emits a detection wave to an object to be detected, receives a reflection wave from the object to be detected, and measures a detection distance to the object to be detected, the method includes a detection image generation step of causing a detection image generation unit to generate a detection image indicating a presence of the object to be detected in a detection range in which the detection wave is emitted, based on a result of measurement by the distance measurement sensor, a rainfall determination step of causing a rainfall determination unit to perform a rainfall determination of whether or not a region in the detection range is in a rainfall state, based on a presence of isolated points, which are discretely positioned, among the objects to be detected in the detection image, a rain removal process step of causing a rain removal processing unit to execute a rain removal process in which the isolated points are removed from the detection image, and an obstacle determination step of causing an obstacle determination unit to perform an obstacle determination of whether or not the object to be detected is an obstacle based on the detection image, in which, in a case where a region is determined to be in the rainfall state in the rainfall determination step, in the obstacle determination step, the obstacle determination is executed, based on the detection image on which the rain removal process is executed in the rain removal process step.

The present invention provides an obstacle detection program causing a computer to execute each step of the obstacle detection method according to the invention.

Advantageous Effects of Invention

According to the present invention, a detection image can be made in which only an obstacle is shown by executing a rain removal process on the detection image during rainfall, and thereby making it possible to avoid erroneous detection of a raindrop as the obstacle.

BRIEF DESCRIPTION OF DRAWINGS

FIG. 17A is an explanatory diagram of first distance data indicating detection distances.

FIG. 17B is an explanatory diagram of second distance data indicating detection distances.

DESCRIPTION OF EMBODIMENTS

First Embodiment

Hereinafter, an obstacle detection device and a moving body according to a first embodiment of the invention will be described with reference to drawings.

Figure 1:
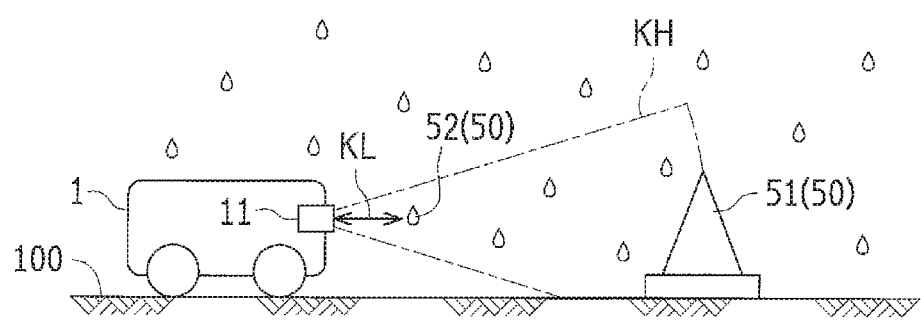
FIG. 1 is an exterior view of a moving body according to a first embodiment of the invention.
Figure 2:
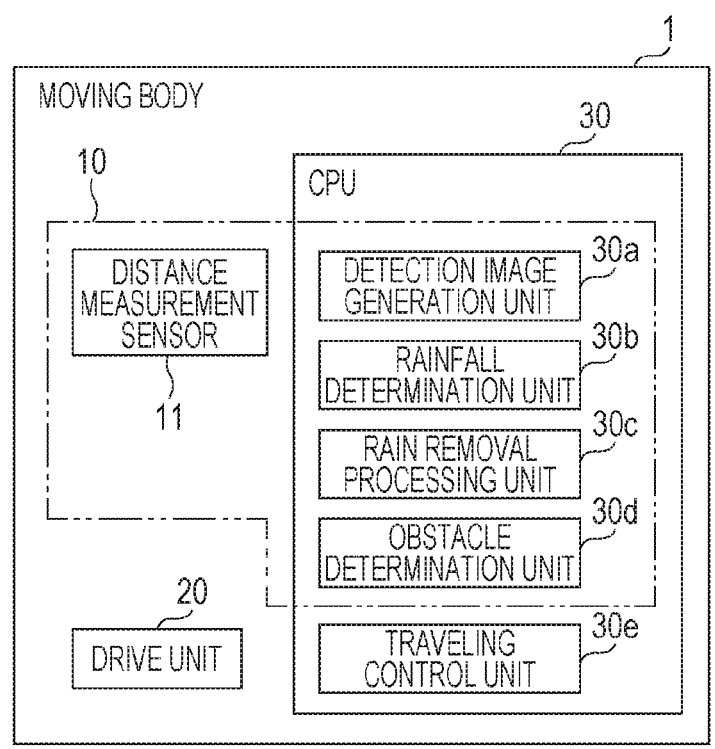
FIG. 2 is a configuration diagram of the moving body illustrated in FIG. 1.

FIG. 1 is an exterior view of the moving body according to the first embodiment of the invention, and FIG. 2 is a configuration diagram of the moving body illustrated in FIG. 1.

The moving body 1 according to the first embodiment of the invention includes an obstacle detection device 10 provided with a distance measurement sensor 11 which emits a detection wave to an object to be detected 50, receives a reflection wave from the object to be detected 50, and measures a detection distance KL to the object to be detected 50, and travels on a traveling surface 100. Specifically, the moving body 1 is a four-wheels vehicle which moves along a route set in advance, and is provided with the distance measurement sensor 11, a drive unit 20, and a CPU 30.

The drive unit 20 is configured with driving sources such as four wheels, a motor, and the like. Also, the drive unit 20 is not limited thereto, the number of wheels thereof may be changed or a belt or the like may be used in the drive unit, and the driving unit may be configured as long as the driving unit can cause the moving body 1 to travel and appropriately adjust a traveling speed thereof. A traveling control unit 30e controls the speed or a direction of traveling of the drive unit 20.

The distance measurement sensor 11 is an optical sensor using light detection and ranging (LIDAR), widely emits laser light, which is a detection wave, to an object and receives reflection light (reflection wave) from the object. Accordingly, the distance measurement sensor 11 detects a position of the object to be detected 50 or a distance to the object to be detected 50. Also, a detected result of the distance measurement sensor 11 will be described in detail with reference to FIG. 3A to FIG. 3C to be described later.

The CPU 30 stores a detection image generation unit 30a, a rainfall determination unit 30b, a rain removal processing unit 30c, an obstacle determination unit 30d, and the traveling control unit 30e as a program stored in advance, and executes processes to be described later by executing the stored program. Also, the CPU 30 is used in common with the moving body 1 and the obstacle detection device 10. In addition, it is omitted in FIG. 2; however, a storage device for storing the detected result of the distance measurement sensor 11 or various settings such as traveling speed may be provided in the moving body 1.

FIG. 1 illustrates the moving body 1 traveling in a rainfall state of which it is raining. In the distance measurement sensor 11, a detection range KH is set along a proceeding direction of the moving body 1, and raindrops 52 are detected as the objects to be detected 50 in addition to an obstacle 51 within the detection range KH.

Figure 3A:
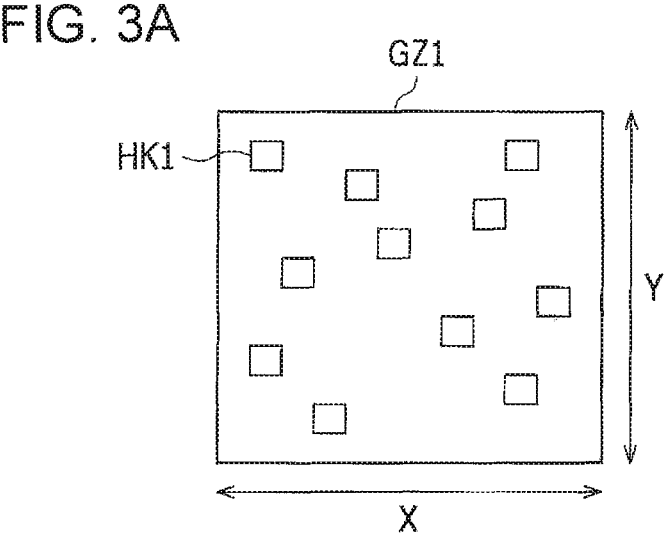
FIG. 3A is an explanatory diagram illustrating a first detection image generated by a detection image generation unit.
Figure 3B:
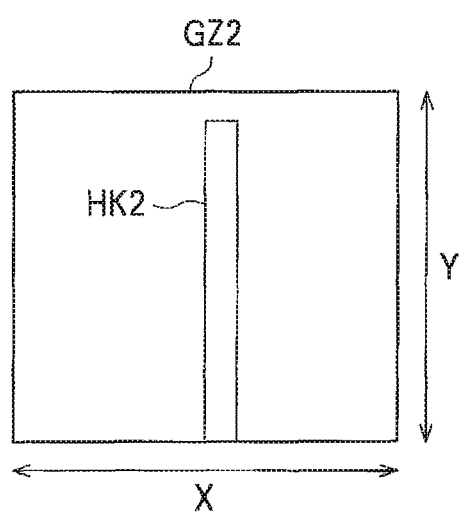
FIG. 3B is an explanatory diagram illustrating a second detection image generated by the detection image generation unit.
Figure 3C:
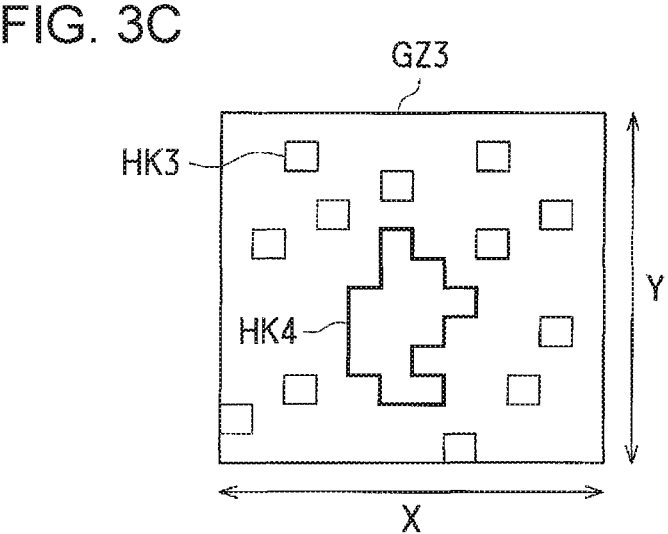
FIG. 3C is an explanatory diagram illustrating a third detection image generated by the detection image generation unit.

FIG. 3A is an explanatory diagram illustrating a first detection image generated by the detection image generation unit, FIG. 3B is an explanatory diagram illustrating a second detection image generated by the detection image generation unit, and FIG. 3C is an explanatory diagram illustrating a third detection image generated by the detection image generation unit.

The distance measurement sensor 11 outputs a position of the object to be detected 50 in the detection range KH, and the detection image generation unit 30a generates a detection image (for example, first detection image GZ1) indicating presence or absence of the object to be detected 50 in the detection range KH based on a result of measurement by the distance measurement sensor 11. The detection image is an image relating to presence or absence of the object to be detected 50 in the detection range KH and a position of the object to be detected 50. In the embodiment, the detection image is described as a plane orthogonal to a proceeding direction of the moving body 1, and is a rectangular shape. In the detection image, the object to be detected 50 is disposed at a coordinate (pixel) corresponding to a position thereof as a reflection point, a pixel (reflection point) where the object to be detected 50 is present is set to "1", a pixel where the object to be detected 50 is absent is set to "0", and the pixels are shown as binarized image data. Also, in the detection images (first detection image GZ1 to tenth detection image GZ10) to be described later, a horizontal direction is set to a horizontal direction X, and a direction perpendicular to the horizontal direction X is set to a vertical direction Y. In addition, in order to simplify description hereinafter, the pixel (pixel not in reflection point) where the object to be detected 50 is absent is referred to as a blank point.

The detection image generation unit 30a periodically generates the detection image at each generation cycle SC (refer to FIG. 12 to be described later) set in advance. That is, the detection image generation unit 30a generates the detection image in every time, which is set in advance as the generation cycle SC, elapses. In the outdoor, since the rainfall state is changed as time elapses, the detection image is periodically generated, and it is determined whether or not it is raining. Also, a timing when the distance measurement sensor 11 emits a detection wave is not particularly limited, and the detection wave may be always emitted, or distance measurement may be performed by regularly emitting the detection wave in accordance with the generation cycle SC. In order to describe later, the time set as the generation cycle SC may be referred to as a frame. For example, two cycles before the generation cycle SC at which the detection image is generated may be referred to as two frames before.

FIG. 3A illustrates the first detection image GZ1 of which the raindrops 52 are detected in the rainfall state, and the number of reflection points HK1 is "11". The reflection points HK1 are discretely positioned in the first detection image GZ1, and are independent from each other. That is, during rainfall, a number of the raindrops 52 are present in the detection range KH, and a number of the raindrops 52 have respectively small size, and thus each of the raindrop is illustrated as one pixel.

FIG. 3B illustrates a second detection image GZ2 in which the long and thin obstacle 51 is detected, and the number of reflection points HK2 is "11". Also, the second detection image GZ2 is not in the rainfall state, and thus a reflection point due to the raindrop 52 is not present. The reflection points HK2 are positioned in a row in the vertical direction Y, and all coordinates in the horizontal direction X is same. In the second detection image GZ2, the obstacle 51 disposed in a bar shape is detected by the distance measurement sensor 11. The big lump obstacle 51 is shown as a plurality of continuous pixels.

FIG. 3C illustrates a third detection image GZ3 of which the raindrop 52 and the obstacle 51 in the rainfall state are detected, and a total number of the reflection points is "26". Also, among the reflection points shown in the third detection image GZ3, the number of reflection points HK3 corresponding to the raindrops 52 is "12", and the number of reflection points HK4 corresponding to the obstacle 51 is "14". Also, the reflection points HK3 corresponding to the raindrops 52 are discretely positioned in the third detection image GZ3, and the reflection points HK4 corresponding to the obstacle 51 are positioned together in the center of the third detection image GZ3. Also, in FIG. 3C, the reflection points HK4 are illustrated by a bold line in order to clarify difference from the reflection points HK3 illustrated by a solid line, but both in image data are treated as "1", and the both are not different from each other.

The obstacle determination unit 30d performs an obstacle determination of whether or not the object to be detected 50 is the obstacle 51 based on the detection image. Specifically, an obstacle threshold relating to the number of the reflection points is set in advance, and the obstacle determination unit 30d determines that the object to be detected 50 is the obstacle 51, if the number of the reflection points in the detection image exceeds the obstacle threshold.

For example, in a case where a reflection point threshold is set to "10", in the first detection image GZ1 to the third detection image GZ3, all the objects to be detected 50 are determined to be the obstacle 51. However, only the small raindrops 52 are detected in the first detection image GZ1, and thus it is not preferable that the obstacle 51 is determined to be present in the first detection image, same as the second detection image GZ2 and the third detection image GZ3. Here, in the obstacle detection device 10, the reflection points due to the raindrops 52 are removed from the detection image by the rain removal processing unit 30c, and thereby avoiding erroneous detection of rain.

Specifically, the rain removal processing unit 30c executes the rain removal process in which isolated points are removed from the detection image, and in the embodiment, a median filter (median process) is used in the rain removal process. Generally, the median process is a process in which a value of each pixel is substituted by a median value of peripheral pixels. Accordingly, the isolated points can be surely removed from the detection image. Hereinafter, the median process will be described with reference to the detection images of which the median process is executed on the first detection image GZ1 to the third detection image GZ3.

Figure 4A:
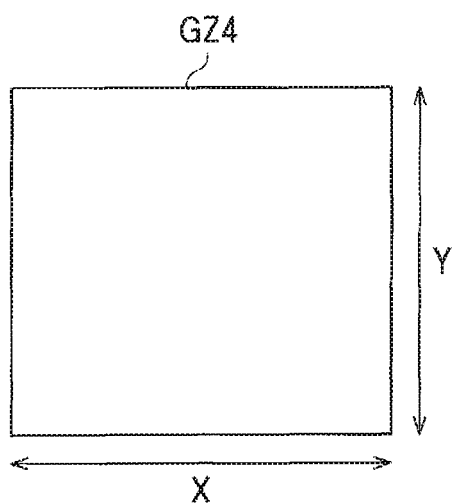
FIG. 4A is an explanatory diagram illustrating a fourth detection image on which a rain removal process is executed by a rain removal processing unit.
Figure 4B:
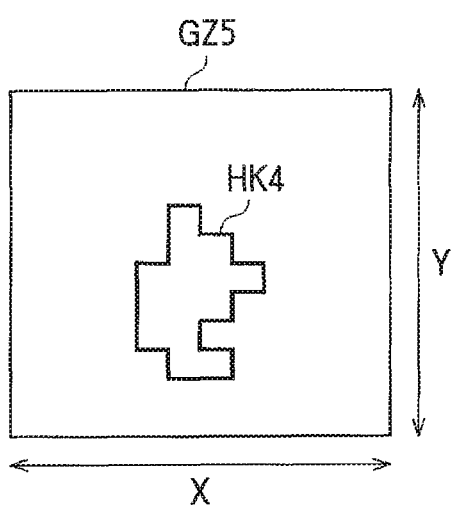
FIG. 4B is an explanatory diagram illustrating a fifth detection image on which the rain removal process is executed by the rain removal processing unit.

FIG. 4A is an explanatory diagram illustrating a fourth detection image on which the rain removal process is executed by the rain removal processing unit, and FIG. 4B is an explanatory diagram illustrating a fifth detection image on which the rain removal process is executed by the rain removal processing unit.

FIG. 4A illustrates a fourth detection image GZ4 in which the median process is executed on the first detection image GZ1 and the second detection image GZ2, and the number of the reflection points is "0".

First, in the first detection image GZ1 (refer to FIG. 3A), since the reflection points HK1 are independent from each other and peripherals thereof are surrounded by the blank points, all of the reflection points HK1 are substituted by the blank points. As a result, the first detection image GZ1 becomes the fourth detection image GZ4 in which the reflection points are not present.

Next, in the second detection image GZ2 (refer to FIG. 3B), the reflection points HK2 are continuous but the blank points are present a lot around the reflection points HK2, and the reflection points HK2 are substituted by the blank points if the median process is executed. As a result, the second detection image GZ2 becomes the fourth detection image GZ4 in which the reflection points are not present in the same manner as the first detection image GZ1.

FIG. 4B illustrates a fifth detection image GZ5 in which the median process is executed on the third detection image GZ3, and the number of the reflection points HK4 is "14". In the third detection image GZ3 (refer to FIG. 3C), the reflection points HK3 corresponding to the raindrops 52 and the reflection points HK4 corresponding to the obstacle 51 are present, but all the reflection points HK3 corresponding to the raindrops 52 are substituted by the blank points in the same manner as the first detection image GZ1. With respect to this, since the reflection points HK4 corresponding to the obstacles 51 are focused on a certain position (coordinate) and the reflection points HK4 are present a lot in the peripherals thereof, the reflection points are not substituted by the blank points even when the median process is executed, and remain as the reflection points HK4. As a result, the third detection image GZ3 becomes the fifth detection image GZ5 in which only the reflection points HK3 corresponding to the raindrops 52 are removed and only the reflection points HK4 corresponding to the obstacles 51 are present.

However, since the second detection image GZ2 is an image in which the long and thin obstacle 51 is detected, it is desired that the object to be detected 50 is determined to be the obstacle 51. However, the second detection image GZ2 becomes the fourth detection image GZ4 if the median process is executed thereon, but the reflection points are not present therein when the obstacle determination is performed on the fourth detection image GZ4 as a target, and thus the object to be detected 50 is not determined to be the obstacle 51. Accordingly, it is desirable that the rain removal process for removing the raindrops 52 is performed during rainfall, but it is desirable that the rain removal process is not executed when it is not raining, and thus whether or not the rain removal process is executed is selected depending on circumstances. Here, the obstacle detection device 10 allows the rainfall determination unit 30b to determine whether or not a region is in the rainfall state, and instructs necessity of the rain removal process.

Specifically, the rainfall determination unit 30b performs a rainfall determination of whether or not the detection range KH is in the rainfall state, based on a presence of the isolated points, which are discretely positioned, among the objects to be detected 50 in the detection image. In the embodiment, at the time of performing the rainfall determination, dispersion values of the objects to be detected 50 in the detection image are calculated.

For example, in a case where the rainfall determination is performed on the first detection image GZ1, first, the median process is executed on the first detection image GZ1, and the fourth detection image GZ4 (median process image) described above is generated.

Next, a difference image is generated in which a difference between the first detection image GZ1 and the median process image is calculated. Here, since the entire of the fourth detection image GZ4 is the blank point, the difference between the first detection image GZ1 and the median process image is almost same as the first detection image GZ1. That is, the difference image in the first detection image GZ1 corresponds to the first detection image GZ1, and a drawing thereof is omitted.

Also, each of the dispersion values in the difference image in the horizontal direction X and the vertical direction Y is calculated. In the rainfall determination, the dispersion threshold relating to the number of the dispersion values are set in advance, and the rainfall determination unit 30b determines that a region is in the rainfall state when the calculated dispersion value exceeds the dispersion threshold. Also, in the embodiment, a horizontal dispersion threshold Thx in the horizontal direction X with respect to a horizontal dispersion value Vx in the horizontal direction X is set, and a vertical dispersion threshold Thy in the vertical direction Y with respect to a vertical dispersion value Vy in the vertical direction Y is set. Further, in a case where "Vx>Thx" and "Vy>Thy" in the rainfall determination, a region is determined to be in the rainfall state. That is, in a case where the dispersion value in any one of the horizontal direction X and the vertical direction Y does not exceed the dispersion threshold which corresponds thereto, the region is determined as not the rainfall state (it is a normal state).

In a case of the first detection image GZ1, since the reflection points HK1 are independent from each other, and are not focused on one location and dispersed, the dispersion value becomes a great value exceeding the dispersion threshold. Accordingly, the first detection image GZ1 is determined to be in the rainfall state.

As described above, the rainfall determination unit 30b performs the rainfall determination by comparing the detection image and the median process image in which the isolated point is removed from the detection image using the median filter. Accordingly, even in a case where both the obstacle 51 and the raindrops 52 are detected, the raindrops 52 are extracted using the median filter, and only the raindrops 52 can be set as a target of the rainfall determination.

However, if the rainfall determination is performed on the second detection image GZ2, the difference image in the second detection image GZ2 is substantially same as the second detection image GZ2. Also, in a case where the dispersion value in the second detection image GZ2 is calculated, since the reflection points HK2 are arranged in a row in the vertical direction Y and a coordinate in the vertical direction Y of each of the reflection points HK2 is different, the vertical dispersion value Vy becomes a great value. With respect to this, since the coordinates of the reflection points HK2 in the horizontal direction X are the same, the horizontal dispersion value Vx becomes a smaller value than the horizontal dispersion threshold Thx. As a result, the second detection image GZ2 is determined to be not in the rainfall state.

As described above, when the dispersion value is calculated and variations of the reflection points are figured out, it can be discriminated whether or not the objects to be detected 50 are the isolated points which are discretely positioned.

Next, a process flow of an obstacle detection method in the obstacle detection device 10 (moving body 1) will be described with reference to drawings.

Figure 5:
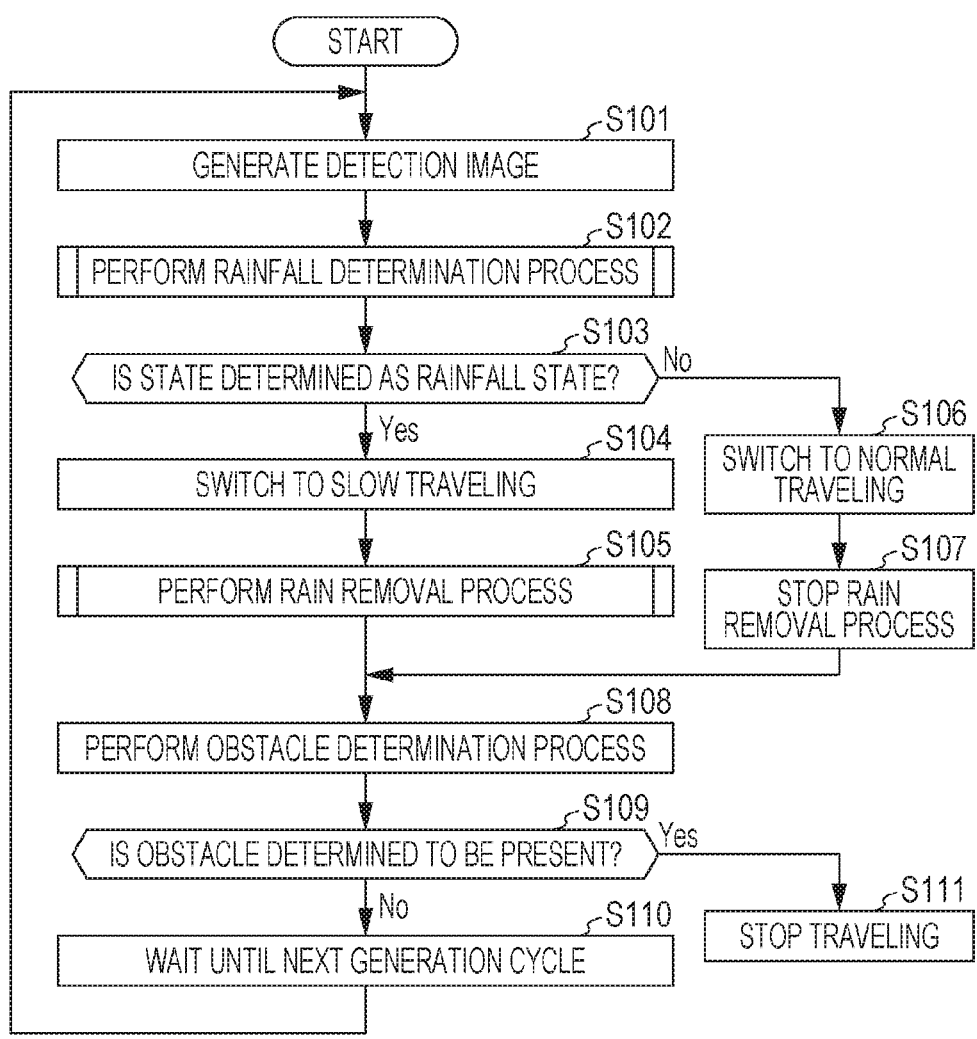
FIG. 5 is a flow chart illustrating a process flow of an obstacle detection method of an obstacle detection device according to the first embodiment of the invention.

FIG. 5 is a flow chart illustrating a process flow of the obstacle detection method of the obstacle detection device according to the first embodiment of the invention.

The moving body 1 is in a state of traveling on a traveling surface 100 at a traveling speed set in advance at the time of starting processes.

In Step S101, the detection image generation unit 30a generates the detection image. The detection image is primarily stored in, for example, a storage device, and the detection images of a plurality of frames may be accumulated.

In Step S102, the rainfall determination unit 30b executes a rainfall determination process (refer to FIG. 6) to be described later.

In Step S103, the rainfall determination unit 30b determines that a region is determined to be in the rainfall state. That is, it is determined whether or not a region is in the rainfall state, in a result output from the rainfall determination unit 30b. As a result, in a case where the region is determined to be in the rainfall state (Yes in Step S103), a procedure goes to Step S104. Meanwhile, in a case where the region is determined to be not in the rainfall state (No in Step S103), the procedure goes to Step S106.

In Step S104, traveling is switched to slow traveling by the traveling control unit 30e. That is, the traveling control unit 30e instructs the drive unit 20 to reduce a traveling speed thereof. In the traveling control unit 30e, a slow speed corresponding to the slow traveling may be set in advance, and a traveling speed at which only a predetermined numerical value is subtracted from a normal traveling speed may be applied. Also, in a case where traveling speed is already reduced to the slow traveling, setting is not necessarily changed.

In Step S105, the rain removal processing unit 30c executes a rain removal process (refer to FIG. 7) to be described later, and a procedure goes to Step S108.

In Step S106, the traveling control unit 30e switches the traveling to the normal traveling. That is, in a case where a traveling speed of the moving body 1 is reduced to be a slow speed, the speed returns to the traveling speed at the time of starting the process. In addition, in a case where the traveling becomes the normal traveling and is performed at an initial traveling speed, setting is not necessarily changed.

In Step S107, the rain removal processing unit 30c stops the rain removal process. That is, in a case where the rain removal process in a previous frame is executed, the rain removal process is stopped, the detection image generated in Step S101 is output without executing the rain removal process thereon.

In Step S108, the obstacle determination unit 30d executes an obstacle determination process. In the obstacle determination process, the obstacle determination is performed on the detection image, but in a case where the rain removal process is executed in Step S105, the obstacle determination is performed on the processed image on which the rain removal process is executed.

In Step S109, the obstacle determination unit 30d determines whether or not the obstacle 51 is present. That is, whether or not the obstacle is present is determined in accordance with a determination of whether or not the object to be detected 50 in the detection image is the obstacle 51. As a result, in a case where the object to be detected is not the obstacle 51 (No in Step S109), the procedure goes to Step S110. Meanwhile, in a case where the object to be detected is the obstacle 51 (Yes in Step S109), the procedure goes to Step S111.

In Step S110, the obstacle detection device 10 waits until the next generation cycle by the detection image generation unit 30a, and the procedure returns to Step S101. That is, the obstacle detection device 10 waits until one frame passes, processes described in Step S101 to Step S109 are repeated. Also, the moving body 1 continuously travels without waiting during the passing of the one frame. Accordingly, in a state in which the moving body 1 travels, the obstacle detection device 10 periodically performs a detection of the obstacle. In addition, in a case where a traveling speed is changed in the middle of the process, the changed speed is maintained until the changed speed is changed again.

In Step S111, the traveling control unit 30e stops the traveling and finishes the process. That is, in a case where the obstacle 51 is determined to be in the detection range KH, the moving body 1 is stopped and waits for instruction.

Next, the rainfall determination process in Step S102 will be described in detail. Also, in the invention, a plurality of methods can be used as the rainfall determination and the rain removal process. Here, in order to discriminate a plurality of the rainfall determination processes and the rain removal processes, the rainfall determination process and the rain removal process according to the first embodiment of the invention are respectively referred to as a rainfall determination process 1 and a rain removal process 1.

Figure 6:
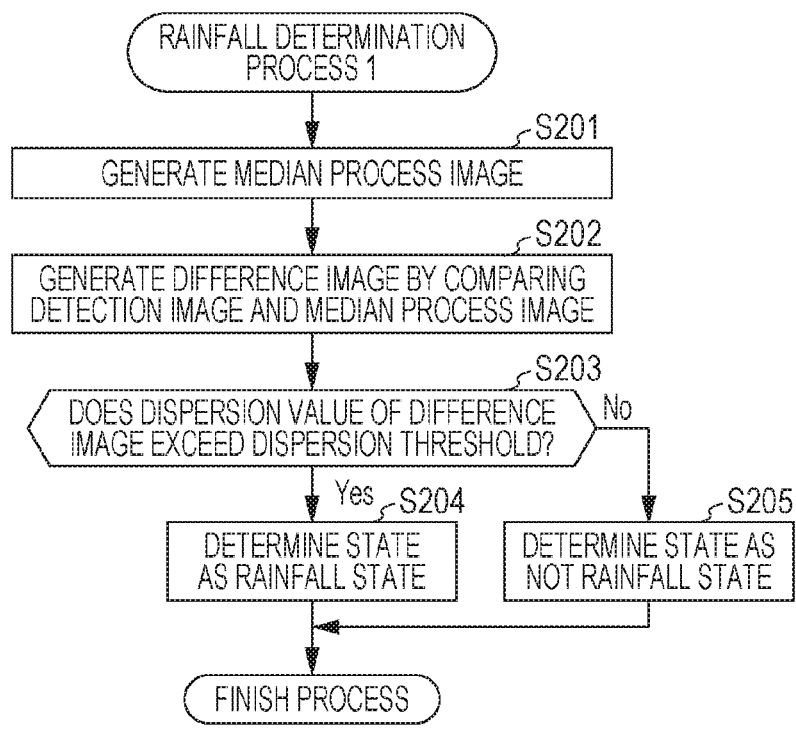
FIG. 6 is a flow chart illustrating a process flow of a rainfall determination process 1 according to the first embodiment of the invention.

FIG. 6 is a flow chart illustrating a process flow of the rainfall determination process 1 according to the first embodiment of the invention.

In Step S201, the rainfall determination unit 30b generates the median process image. That is, the median process is executed on the detection image generated in Step S101 so that the image becomes the median process image.

In Step S202, the rainfall determination unit 30b generates a difference image which is made by comparing the detection image and the median process image.

In Step S203, the rainfall determination unit 30b determines whether or not the dispersion value of the difference image exceeds the dispersion threshold. That is, the horizontal dispersion value Vx and the vertical dispersion value Vy in the difference image are calculated, and the horizontal dispersion threshold Thx and the vertical dispersion threshold Thy are compared. As a result, in a case where the dispersion value exceeds the dispersion threshold (Yes of Step S203), a procedure goes to Step S204. Meanwhile, in a case where the dispersion value does not exceed the dispersion threshold (No in Step S203), the procedure goes to Step S205.

Also, before comparing the dispersion value with the dispersion threshold, the number of the reflection points in the difference image is compared with a threshold of the reflection points set in advance, and in a case where the number of the reflection points does not exceed the threshold of the reflection points, regardless of the dispersion value, a procedure may go to Step S205. That is, if the reflection points are small, accuracy of the dispersion value is reduced, and it is difficult to determine whether or not reflection points in actual deviate. In addition, if the reflection points are small, even when it is raining, it can be inferred that there is no heavy rain of a degree at which the rain removal process is necessary.

In Step S204, the rainfall determination unit 30b determines that a region is in the rainfall state, and finishes the rainfall determination process 1.

In Step S205, the rainfall determination unit 30b determines that the region is not in the rainfall state, and finishes the rainfall determination process 1.

Figure 7:
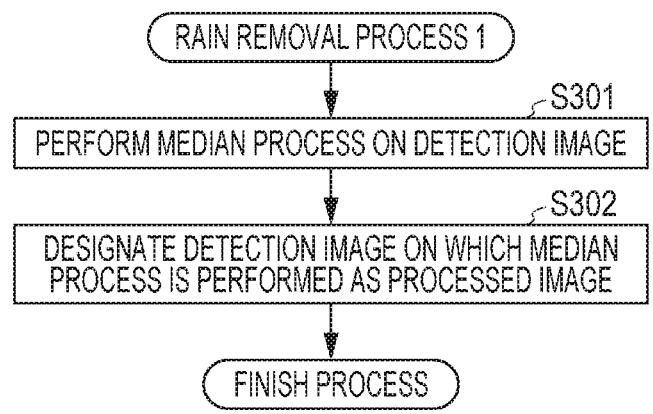
FIG. 7 is a flow chart illustrating a process flow of a rain removal process 1 according to the first embodiment of the invention.

FIG. 7 is a flow chart illustrating a process flow of the rain removal process 1 according to the first embodiment of the invention.

In Step S301, the rain removal processing unit 30c executes the median process on the detection image. Also, if the median process image is generated in the rainfall determination process (for example, Step S201) described above, the image can be used, and thus there is no need to generate a new image, and a processing time can be shortened.

In Step S302, the rain removal processing unit 30c designates the detection image on which the median process is executed as a processed image, and finishes the process. That is, the obstacle determination described above is performed on the processed image which is designated herein.

In the embodiment, the above-described processes are executed, and hereinafter, as a specific example, a case of each of the first detection image GZ1 to the third detection image GZ3 which are generated in Step S101 will be respectively described.

In a case where the first detection image GZ1 is generated, a region is determined to be the rainfall state in the rainfall determination process of Step S102 (Step 204 of FIG. 6). As a result, the moving body 1 travels slowly, and the rain removal process (Step 105 of FIG. 5) is executed on the first detection image GZ1. As a result of the rain removal process, the first detection image GZ1 becomes the fourth detection image GZ4 in which the reflection points HK1 is removed, and the obstacle determination is performed on the fourth detection image GZ4. Since the obstacle 51 is determined to be not present in the fourth detection image GZ4, a procedure goes to Step S110. After that, in a state in which the moving body 1 travels slowly, the detection image is generated again, and detection of the obstacle 51 is performed.

In a case where the second detection image GZ2 is generated, it is determined that the region is not in the rainfall state in the rainfall determination process (Step 205 of FIG. 6). As a result, the moving body 1 travels normally, and the rain removal process is not executed. The obstacle determination is performed on the second detection image GZ2 as a target, and the obstacle 51 is present in the second detection image (Step S111 of FIG. 5). Also, the moving body 1 stops to travel.

In a case where the third detection image GZ3 is generated, the region is determined to be in the rainfall state in the rainfall determination process. Also, the rain removal process is performed on the third detection image GZ3, and the fifth detection image GZ5 becomes a target on which the obstacle determination is performed. In the obstacle determination, the obstacle 51 is determined to be present, and the moving body 1 stops.

As described above, in a result of measurement by the distance measurement sensor 11, both of the raindrop 52 and the obstacle 51 are considered to be the object to be detected 50, and both of them cannot be discriminated. Here, during rainfall, the detection image can be illustrated with only the obstacle 51 by executing the rain removal process on the detection image, and erroneous detection in which the raindrop 52 is set as the obstacle 51 can be avoided.

In addition, in a case where the rainfall determination unit 30b determines that the region is in the rainfall state, the traveling control unit 30e controls the traveling speed to be reduced. Accordingly, during rainfall, the speed of the moving body 1 is reduced in consideration of time necessary for the processes which becomes long due to the rain removal process and the like, and thus time until being close to the obstacle 51 or the like extends, and thereby making possible to avoid coming into contact with the obstacle 51 and the like. For example, in the rainfall state, in a case where the long and thin obstacle 51 is present as illustrated in FIG. 3B, there is a possibility that the obstacle 51 is removed by the rain removal process, but the obstacle determination is performed again until being closed to the obstacle 51 by reducing the speed of the moving body 1. As a result, a range in which the obstacle 51 is taken in the detection image is increased when closed and detected, and the obstacle 51 can be determined to be present without removing the obstacle 51 by the rain removal process.

The obstacle detection method according to the invention is the obstacle detection method of the obstacle detection device 10 including the distance measurement sensor 11 that emits a detection wave to the object to be detected 50, receives a reflection wave from the object to be detected 50, and measures the detection distance KL to the object to be detected 50, the method includes a detection image generation step of causing the detection image generation unit 30a to generate a detection image indicating a presence of the object to be detected 50 in a detection range KH in which the detection wave is emitted, based on a result of measurement by the distance measurement sensor 11, a rainfall determination step of causing the rainfall determination unit 30b to perform a rainfall determination of whether or not a region in the detection range KH is in a rainfall state, based on a presence of isolated points, which are discretely positioned, among the objects to be detected 50 in the detection image, a rain removal process step of causing the rain removal processing unit 30c to execute a rain removal process in which the isolated points are removed from the detection image, and an obstacle determination step of causing the obstacle determination unit 30d to perform an obstacle determination of whether or not the object to be detected 50 is the obstacle 51 based on the detection image, in which, in a case where a region is determined to be in the rainfall state in the rainfall determination step, in the obstacle determination step, the obstacle determination is executed, based on the detection image on which the rain removal process is executed in the rain removal process step.

Second Embodiment

Next, an obstacle detection device and a moving body according to a second embodiment of the invention will be described with reference to drawings. Also, since the second embodiment is substantially same as the first embodiment, an exterior view or a configuration diagram thereof is omitted, and the same numeral is given to a configuration component substantially having the same function as that of the first embodiment so that description thereof will be omitted.

Figure 8:
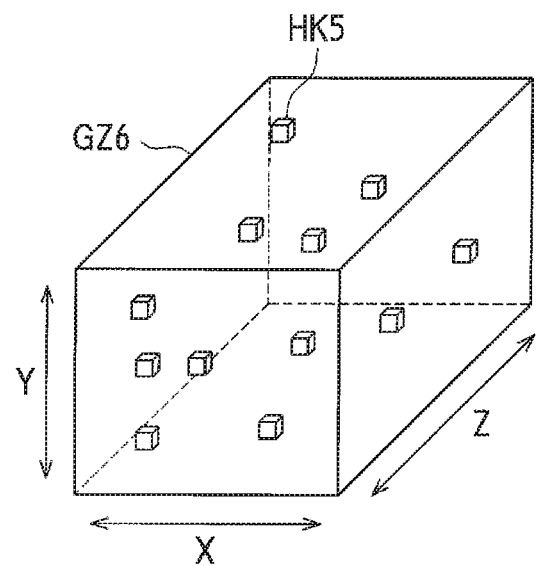
FIG. 8 is an explanatory diagram illustrating a sixth detection image generated by a detection image generation unit according to a second embodiment of the invention.

FIG. 8 is an explanatory diagram illustrating a sixth detection image generated by the detection image generation unit in the second embodiment of the invention.

In the second embodiment, a type of the detection image generated by the detection image generation unit 30a is different from that of the first embodiment. Specifically, the detection image is a planar image shown in two-dimension in the first embodiment, but the detection image is a three-dimensional image shown in three-dimension in the second embodiment. That is, the detection image generation unit 30a generates a three-dimensional image (for example, sixth detection image GZ6) corresponding to a detection range which is a three-dimensional space as the detection image.

FIG. 8 illustrates an image in which the reflection points HK5 is disposed in a three-dimensional space in the sixth detection image GZ6 generated in the second embodiment. In the sixth detection image GZ6, in addition to the horizontal direction X and the vertical direction Y, a depth direction Z orthogonal to both of the directions is illustrated. At the time of disposing the reflection points HK5, a position thereof in the depth direction Z may be determined based on the detection distance KL of the object to be detected 50. In the sixth detection image GZ6, the raindrops 52 detected during rainfall are illustrated as the reflection points HK5, the reflection points HK5 are respectively separated from each other in the horizontal direction X and the vertical direction Y, and also separated from each other in the depth direction Z.

In the second embodiment, an obstacle detection method same as that of the first embodiment is executed. In the rainfall determination, the dispersion values with respect to the sixth detection image GZ6 in accordance with the horizontal direction X and the vertical direction Y are calculated, and also calculated in the depth direction Z. in any one of the horizontal direction X, the vertical direction Y, and the depth direction Z, in a case where the calculated dispersion values do not exceed the corresponding dispersion threshold, a region is determined to be not in the rainfall state (it is a normal state). Accordingly, it can be determined whether or not it is raining by executing a process of detecting rain in the three-dimensional space. That is, even in a case where the large obstacle 51 is formed in a shape of which a plurality of the reflection points HK5 are adjacent to each other, a positional relationship in which the points are separated from each other can be understood by comparing a distances to each of the reflection points HK5.

At the time of generating the sixth detection image GZ6, the detection image generation unit 30a may generate not only a three-dimensional image but also an image (for example, first detection image GZ1) of which a detection result is illustrated as a planar shape. When the rain removal process or the obstacle determination is executed on a planar detection image as a target, an image process is simplified, and a process time thereof can be reduced. In addition, in a case where the obstacle determination and the like are executed on the three-dimensional image as a target, a shape of the object to be detected 50 can be accurately understood, and thereby making it possible to improve detection accuracy.

Third Embodiment

Next, an obstacle detection device and a moving body according to a third embodiment of the invention will be described with reference to drawings. Also, since the third embodiment is substantially same as the first embodiment, an exterior view or a configuration diagram thereof will be omitted, and the same numeral is given to a configuration component having the same function as that of the first embodiment and the second embodiment so that description thereof will be omitted.

Figure 9:
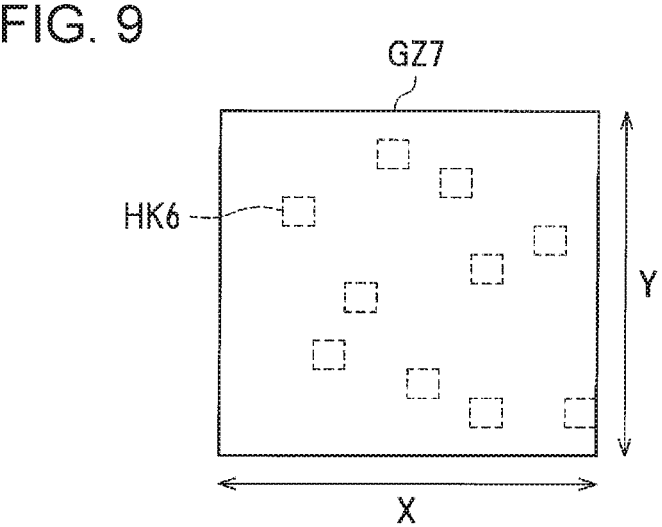
FIG. 9 is an explanatory diagram illustrating a seventh detection image generated by a detection image generation unit according to a third embodiment of the invention.
Figure 10:
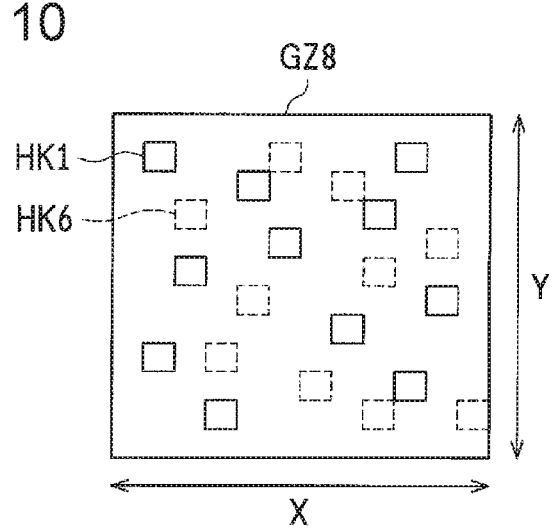
FIG. 10 is an explanatory diagram illustrating a difference image generated by comparing the first detection image and the seventh detection image.

FIG. 9 is an explanatory diagram illustrating a seventh detection image generated by the detection image generation unit in the third embodiment of the invention, and FIG. 10 is an explanatory diagram illustrating a difference image generated by comparing the first detection image with the seventh detection image.

In the third embodiment, a method used in the rainfall determination is different from that of the first embodiment. In the first embodiment, a difference from the median process image on which the median process is executed on the detection image is calculated, but in the third embodiment, the rainfall determination unit 30b compares two detection images generated at each different generation cycle SC, and performs the rainfall determination.

FIG. 9 illustrates a seventh detection image GZ7 in which the raindrops 52 in the rainfall state are detected, and the number of the reflection points HK6 is "10". The reflection points HK6 are discretely positioned in the seventh detection image GZ7, and are independent from each other. In addition, the seventh detection image GZ7 is a detection image generated before one frame of the first detection image GZ1. That is, since the obstacle 51 which is installed is not moved, a position thereof is not changed even if time elapses; however, the raindrops 52 are moved as time elapse, and thus a position thereof in the detection range KH is changed. Therefore, in the seventh detection image GZ7, the reflection points HK6 (raindrops 52) are disposed different from that of the first detection image GZ1. Also, in FIG. 9 and FIG. 10, in order to clarify a difference of the reflection points HK1 illustrated by a solid line, the reflection points HK6 are illustrated by a broken line, but all of the reflection points in image data is treated as "1", and there is no difference between them.

FIG. 10 illustrates an eighth detection image GZ8 (difference image) generated by calculating a difference between the first detection image GZ1 and the seventh detection image GZ7, and illustrates the reflection points HK1 of the first detection image GZ1 and the reflection points HK6 of the seventh detection image GZ7. Also, in the difference image, overlapping reflection points are removed. In the third embodiment, the rainfall determination is performed on the eighth detection image GZ8 as a target, and it is determined whether or not it is raining based on the dispersion value in the eighth detection image GZ8. As described above, by comparing the detection image at a different generation cycle SC, it can be understood that the raindrops which are moved as time elapses. In addition, since the image process and the like are not executed on the detection image, the rainfall determination can be performed without removing a small obstacle and the like.

Next, a process flow of the obstacle detection method in the third embodiment will be described with reference to the drawings. In the third embodiment, the rainfall determination process thereof is different from that of the first embodiment, but the other are processed in the same manner as the first embodiment. That is, in the third embodiment, the process flow illustrated in FIG. 5 described above is executed, and a rainfall determination process 2 to be described is executed in Step S102.

Figure 11:
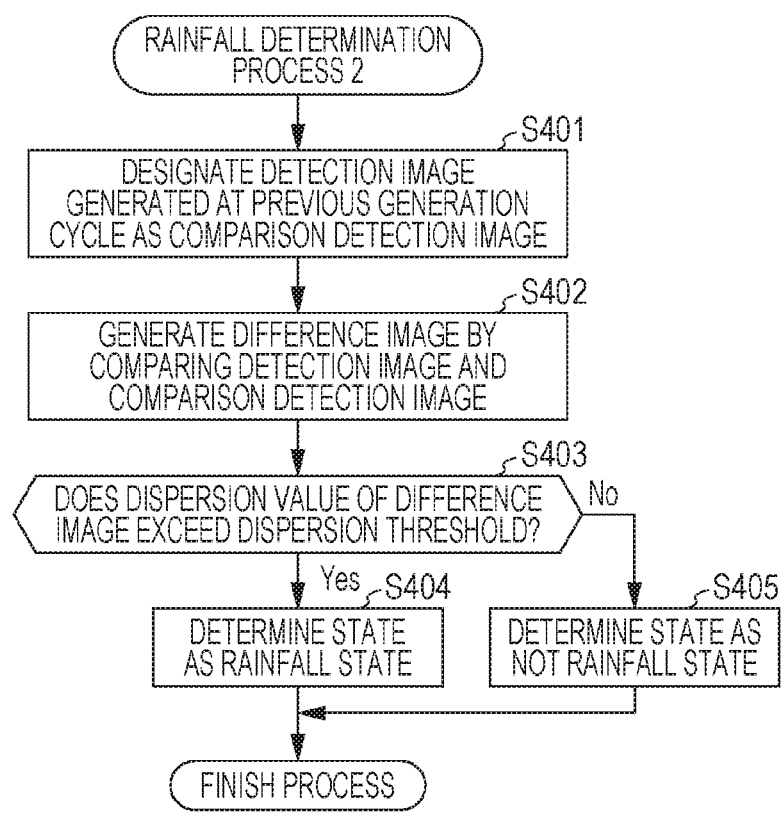
FIG. 11 is a flow chart illustrating a process flow of a rainfall determination process 2 according to the third embodiment of the invention.

FIG. 11 is a flow chart illustrating a process flow of the rainfall determination process 2 according to the third embodiment of the invention.

In Step S401, the rainfall determination unit 30b designates the detection image generated at a previous generation cycle as a comparison detection image. That is, the detection image generated in Step S101 before one frame is set to the comparison detection image.

In Step S402, the rainfall determination unit 30b generates the difference image generated by comparing the detection image with the comparison detection image. That is, in a case where the first detection image GZ1 is set to the detection image and the seventh detection image GZ7 is set to the comparison detection image, the eighth detection image GZ8 is generated as the difference image.

Processes of Step S403 to Step S405 are same as the processes of Step S203 to Step S205, and thus description thereof will be omitted.

Fourth Embodiment

Next, the obstacle detection device and the moving body according to a fourth embodiment of the invention will be described with reference to drawings. Also, since the fourth embodiment is substantially same as the first embodiment, an exterior view or a configuration diagram thereof will be omitted, and the same numeral is given to a configuration component having a function substantially same as that of the first embodiment to the third embodiment so that description thereof will be omitted.

Figure 12:
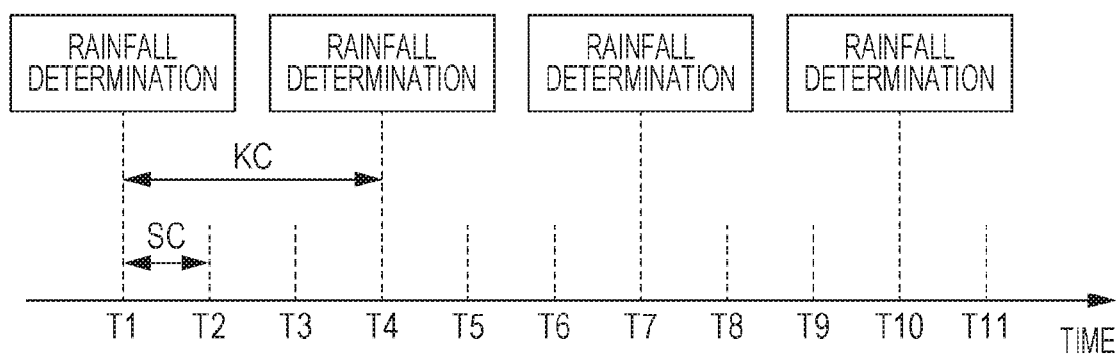
FIG. 12 is an explanatory diagram illustrating a relationship between a generation cycle and a rainfall determination cycle according to a fourth embodiment of the invention.

FIG. 12 is an explanatory diagram illustrating a relationship between the generation cycle and a rainfall determination cycle according to the fourth embodiment of the invention.

In the fourth embodiment, a cycle at which the rainfall determination is performed is deferent from the cycle of the first embodiment. In the first embodiment, the rainfall determination is performed at each generation cycle SC at which the detection image is generated, but in the fourth embodiment, the rainfall determination is performed at each of the plurality of the generation cycles SC.

FIG. 12 illustrates timings when the rainfall determination is performed as time elapses. In FIG. 12, a time T1 to a time T11 indicate times when the detection image is generated, and for example, a gap between the time T1 and the time T2 corresponds to one generation cycle SC (one frame).

When description is performed as time elapses, first, at the time T1, the detection image is generated, and the rainfall determination is performed. Next, at the time T2 and the time T3, the detection image is generated, but the rainfall determination is not performed. Also, at the time T4, in accordance with generation of the detection images, the rainfall determination is performed. After that, the rainfall determination is executed at only the time T7 and the time T10, and is not executed in the other frames. Accordingly, the detection image is generated in each frame, the rainfall determination is performed in every three frames, after the time T10, and the same processes are repeated.

As described above, the rainfall determination unit 30b performs the rainfall determination at each of the plurality of generation cycles SC, and a gap in which the rainfall determination is performed is set to a rainfall determination cycle KC in advance. In the embodiment, the rainfall determination cycle KC is set to three frames; however, it is not limited thereto, the gap at which the rainfall determination is performed may be appropriately changed. Accordingly, an increase of the time due to the rainfall determination can be suppressed to be minimized as needed by performing the rainfall determination with a time. That is, the generation cycle SC in the obstacle detection device 10 is set to be short so that the device is capable of quickly responding to the obstacle 51, but a change of weather is gradual when compared to the obstacle 51 or the like. Therefore, a frequency of the rainfall determination is reduced, and excessive processes may be suppressed.

Next, a process flow of the obstacle detection method of the fourth embodiment will be described with reference to drawings. Processes in the fourth embodiment are substantially same as that of the first embodiment, and differences thereof will be described in detail and description of the others will be omitted.

Figure 13:
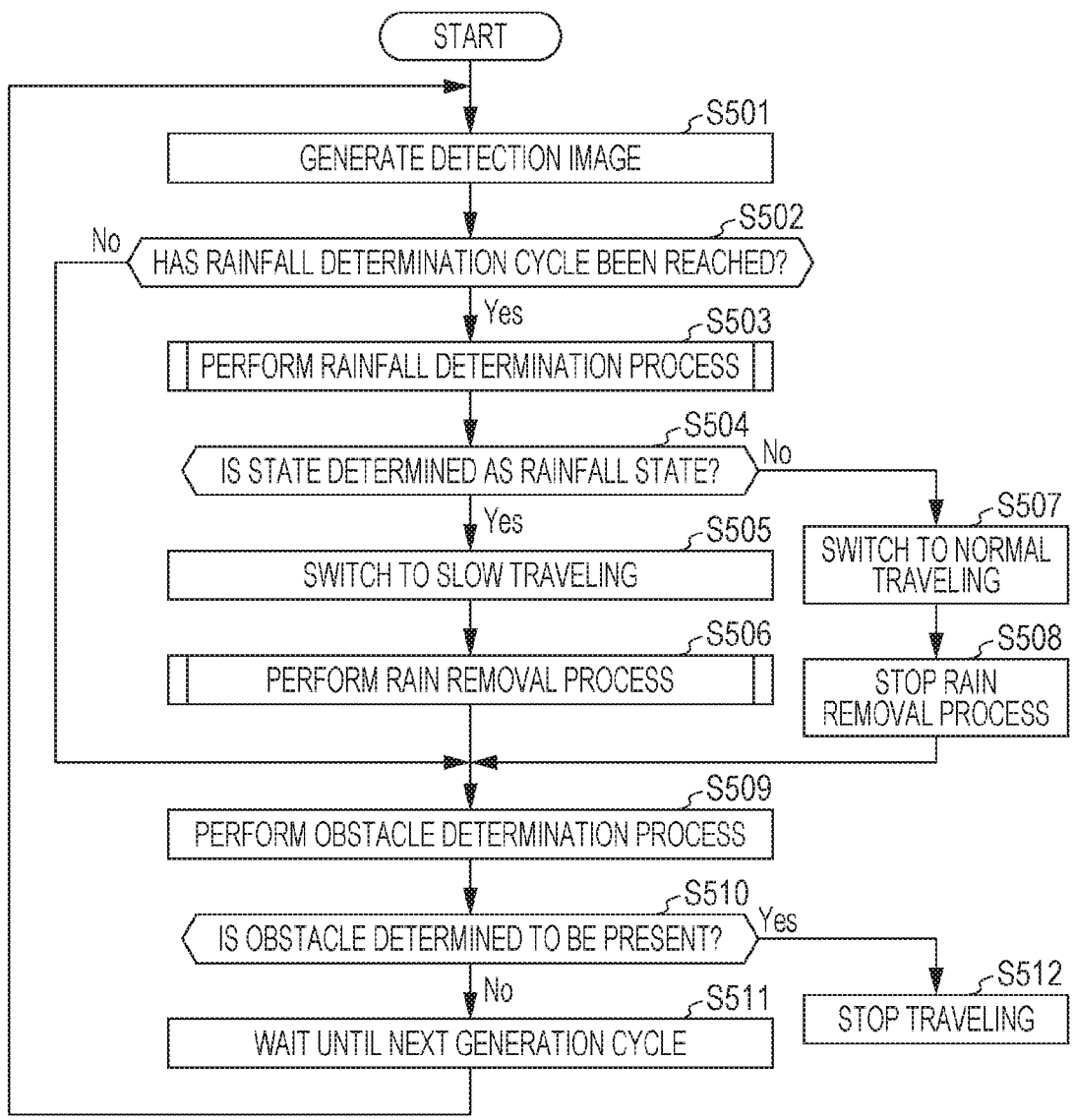
FIG. 13 is a flow chart illustrating a process flow of an obstacle detection method of an obstacle detection device according to the fourth embodiment of the invention.

FIG. 13 is a flow chart illustrating the process flow of the obstacle detection method of the obstacle detection device according to the fourth embodiment of the invention.

The moving body 1 is in a state of being traveling on the traveling surface 100 at a traveling speed at the time of starting the process in the same manner as the first embodiment.

In Step S501, in the same manner as the first embodiment, the detection image generation unit 30*a* generates the detection image.

In Step S502, the rainfall determination unit 30*b* determines whether or not the rainfall determination cycle KC has been reached. Here, the previous rainfall determination is executed, and it is determined whether or not the time set as the rainfall determination cycle KC elapses. As a result, in a case of reaching the rainfall determination cycle KC (Yes in Step S502), a procedure goes to Step S503. Meanwhile, in a case of not reaching the rainfall determination cycle KC (No in Step S502), the procedure goes to Step S509.

The processes of Step S503 to Step S512 are the same as that of Step S102 to Step S111 described above, and thus a specific description will be omitted. That is, in a case of reaching the rainfall determination cycle KC, in Step S503 corresponding to Step S102, the rainfall determination process is executed. Meanwhile, in a case of not reaching the rainfall determination cycle KC, in Step S509 corresponding to Step S108, the obstacle determination process is executed. Accordingly, depending on whether or not it the rainfall determination cycle KC has been reached, it is determined whether or not the rainfall determination is necessary. Also, in the rainfall determination process of Step S503, the rainfall determination process 1 illustrated in FIG. 6 may be applied, and the rainfall determination process 2 illustrated in FIG. 11 may be applied.

Fifth Embodiment

Next, an obstacle detection device and a moving body according to a fifth embodiment of the invention will be described with reference to drawings. since the fifth embodiment is substantially same as the first embodiment, an exterior view or a configuration diagram thereof will be omitted, and the same numeral is given to a configuration component having a function substantially same as that of the first embodiment to the fourth embodiment so that description thereof will be omitted.

Figure 14:
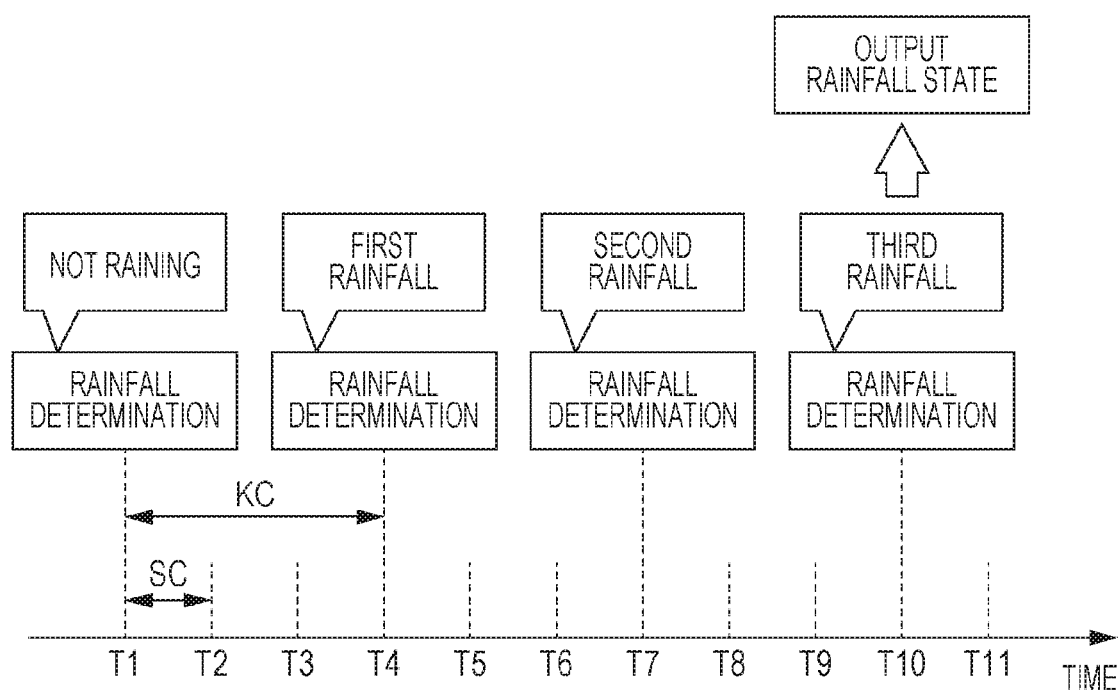
FIG. 14 is an explanatory diagram illustrating a relationship between repeating of a rainfall determination and outputting of a determined result according to a fifth embodiment of the invention.

FIG. 14 is an explanatory diagram illustrating a relationship between repeating of the rainfall determination in the fifth embodiment of the invention and outputting of the determined result.

The fifth embodiment is different from the fourth embodiment in that the rainfall determination is repeated and the determined result is output. In the fourth embodiment, the determined result in which the rainfall determination is performed is immediately output, but in the fifth embodiment, the determined result is output when the same determined result is continued.

FIG. 14 illustrates timings when the rainfall determination is performed as the time elapses in the same manner as FIG. 12. In FIG. 14, as same as FIG. 12, the rainfall determination is performed in every three frames, and the rainfall determinations are performed at the time T1, the time T4, the time T7, and the time T10. In the result of the rainfall determination, it is determined that it is not raining at the time T1, and it is determined that it is raining at the time T4, the time T7, and the time T10. In the embodiment, when the same determination is made continuously three times, the determined result is output, and at the time T10, the determined result in which it is in the rainfall state is output. Also, a specific process will be described in conjunction with process flows illustrated in FIG. 15 and FIG. 16.

Next, the process flow of the obstacle detection method in the fifth embodiment will be described with reference to drawings. Since the processes in the fifth embodiment are executed in the substantially same manner as that of the fourth embodiment, differences will be described in detail, and description of the others will be omitted.

Figure 15:
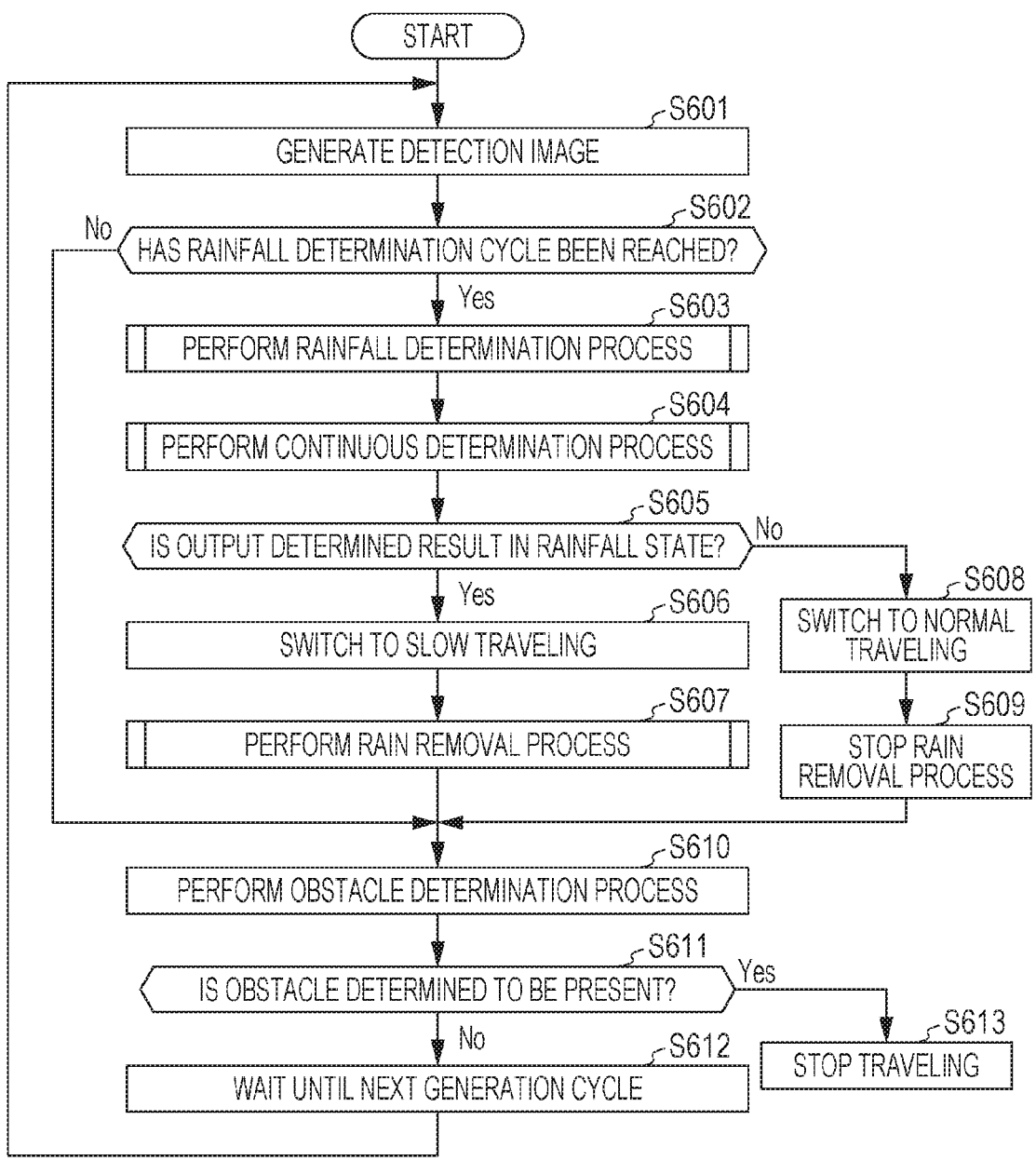
FIG. 15 is a flow chart illustrating a process flow of an obstacle detection method of an obstacle detection device according to the fifth embodiment of the invention.
Figure 16:
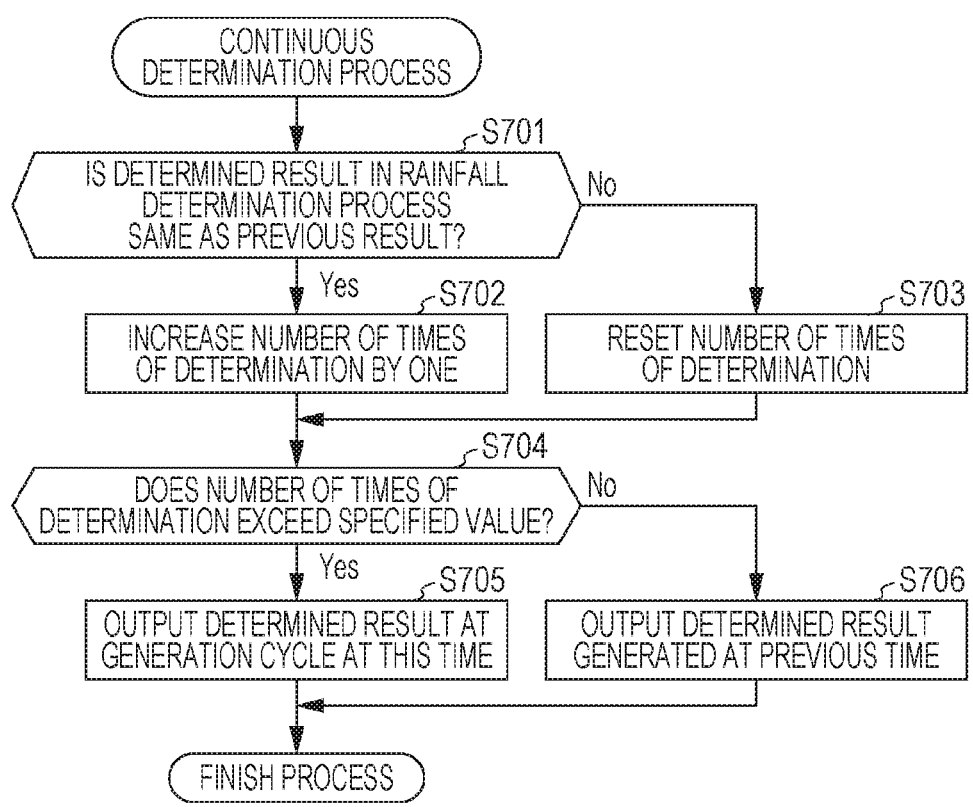
FIG. 16 is a flow chart illustrating a process flow of a continuous determination process according to the fifth embodiment of the invention.

FIG. 15 is a flow chart illustrating a process flow of the obstacle detection method of the obstacle detection device according to the fifth embodiment of the invention, and FIG. 16 is a flow chart illustrating a process flow of a continuous determination process according to the fifth embodiment of the invention.

Processes of Step S601 to Step S603 are the same as that of Step S501 to Step S503, processes of Step S605 to Step S613 are the same as that of Step S504 to Step S512 described above, and thus a specific description thereof will be omitted. That is, the fifth embodiment is different from the fourth embodiment in that, after Step S603, the continuous determination process illustrated in FIG. 16 is executed as Step S604. Here, with reference to FIG. 16, the continuous determination process will be described.

In Step S701, the rainfall determination unit 30*b* determines whether or not the determined result in the rainfall determination process (Step S603) is the same as a determined result in a previous rainfall determination process. For example, if the rainfall determination is performed at the time T4 of FIG. 14, the determined result is compared with that of the rainfall determination at the time T1. As a result, in a case where the determined result is the same as in the previous result (Yes in Step S701), a procedure goes to Step S702. Meanwhile, in a case where the determined result is different from the previous result (No in Step S701), the procedure goes to Step S703.

In Step S702, the number of times of determination is increased by one by the rainfall determination unit 30*b*. In the embodiment, a result of the rainfall determination is counted as the number of times of determination and is stored. For example, in a case where the number of times of determination is stored as one time, the number thereof is stored as two times through Step S702.

In Step S703, the rainfall determination unit 30*b* resets the number of times of determination. Here, regardless of the stored number of times of determination, the number of times of determination is stored as one time.

In Step S704, the rainfall determination unit 30*b* determines whether or not the number of times of determination exceeds a specified value. The specified value is set in advance as three times, and it is determined that the number of times exceeds the specified value when the number of times of determination is three times. As a result, in a case where the number of times of determination exceeds the specified value (Yes in Step S704), the procedure goes to Step S705. Meanwhile, the number of times of determination does not exceed the specified value (No in Step S704), the procedure goes to Step S706. Also, the specified value is set as three times in the embodiment, but the specified value may be appropriately set.

In Step S705, the rainfall determination unit 30b outputs the determined result at the generation cycle SC at this time, and finishes the process.

In Step S706, the rainfall determination unit 30b outputs the determined result output at previous, and finishes the process.

After the continuous determination process, in Step S605, the rainfall determination unit 30b determines whether or not a state of the output determined result is in the rainfall state. That is, a process in Step S605 is executed in the same manner as Step S504, and if a region is in the rainfall state, a procedure goes to Step S606, and managing such as slow traveling of the moving body 1 is performed. In addition, if the region is not in the rainfall state, the procedure goes to Step S608, and the moving body 1 normally travels.

In the embodiment, the above-described processes are executed, and hereinafter, a case in which the continuous determination process illustrated in FIG. 14 will be described as a specific example. Also, before the time T1, it is assumed that the determined result in which a region is not in the rainfall state is continuously output.

At the time T1, since it is determined that the region is not in the rainfall state, and the determined result thereof is the same as the previous, the number of times of determination is increased by one (Step S702). Also, the number of times of determination exceeds the specified value, and the determined result in which the region is not in the rainfall state is output (Step S705).

At the time T4, since it is determined that the region is in the rainfall state, and the determined result thereof is different from that of the previous, the number of times of determination is reset (Step S703). Also, since the number of times of determination is one time, and does not exceed the specified value, the determined result (not in rainfall state) same as that of the time T1 is output (Step S706).

At the time T7, since it is determined that the region is in the rainfall state, and the determined result is the same as that in the previous, the number of times of determinations is increased by one so as to be two times. Also, since the number of times of determination does not exceed the specified value, the determined result same as that of the time T4 is output.

At the time T10, since it is determined that the region is in the rainfall state, and the determined result is the same as that in the previous, the number of times of determination is increased by one so as to be three times. As a result, the number of times of determination exceeds the specified value, and the determined result (in rainfall state) at the time T10 is output (Step S705).

As described above, since it is determined that it is raining at the time T4, but it is determined that it is not raining at the time T1 in the previous, the same determination is not continuously made, the determined result in which the region is in the rainfall state is not output. Also, since it is determined that it is also raining at the time T7, but the number of times the same determination is continuously made is twice, the determined result is not output. Further, when it is determined that it is raining at the time T10, the number of times the same determination is continuously made is three times, and the determined result in which the region is in the rainfall state is output. In a case where the rainfall determinations are repeated, raining or the like continues to some extent, and the same result is continued, but if it is temporal noise, a different result is output. In a case where the same result is continued, it is determined whether or not it is raining, and erroneous detection in which noise of the detection image or the like is a raindrop can be prevented.

Also, in the fifth embodiment, it is configured that the rainfall determination is performed in each of the plurality of frames, but it is not limited thereto, and in the same manner as the first embodiment, the rainfall determination may be performed in one frame.

Sixth Embodiment

Next, an obstacle detection device and a moving body according to a sixth embodiment of the invention will be described with reference to drawings. Also, since the sixth embodiment is substantially same as the first embodiment, an exterior view or a configuration diagram thereof will be omitted, and the same numeral is given to a configuration component having a function substantially same as that of the first embodiment to the fifth embodiment so that description thereof will be omitted.

FIG. 17A is an explanatory diagram of first distance data indicating a detection distance, and FIG. 17B is an explanatory diagram of second distance data indicating the detection distance. Also, in FIG. 17A and FIG. 17B, in order to highlight a part, the part is illustrated by hatching.

In the sixth embodiment, the rainfall determination unit 30b calculates a difference between the detection distance KL and peripheries of the object to be detected 50 in the detection image at the time of the rainfall determination. Also, in the rainfall determination, a measurement point (pixel) of which the difference between the detection distance KL and the peripheries is large is set to an isolated point, and it is determined whether or not it is raining based on the number of the isolated points.

In the embodiment, at the time of generating the detection image, the distance data indicating the detection distance KL in each coordinate is generated. The first distance data DT1 and the second distance data DT2 illustrated in FIG. 17A and FIG. 17B are specific examples of which a part of the generated distance data is enlarged. In the distance data, coordinates are illustrated in a matrix, and the coordinates and the detection distance KL are related to each other. The first distance data DT1 and the second distance data DT2 are a matrix of "3×3". In the horizontal direction X, "1 column", "2 column", and "3 column" are arranged in a row, and in the vertical direction Y, "A row", "B row", and "C row" are arranged in a row. Hereinafter, in order to simplify the description, the coordinates are illustrated in conjunction with rows and columns. For example, a coordinate of an upper left stage (1 row and 1 column) is referred to as "A1", and a coordinate of a right middle stage (2 row and 3 column) is referred to as "B3". Also, the first distance data DT1 and the second distance data DT2 are illustrated as diagrams of which a part of the distance data is enlarged, and the distance data may be configured as many rows and columns than "3×3".

Regarding the detection distance KL in the first distance data DT1 illustrated in FIG. 17A, "B2" is 1 m (meter), and the coordinates of the others are 10 m to 13 m. Specifically, a distance threshold relating to a difference of the detection distance KL is set in advance, and in the embodiment, the distance threshold is set to 5 m. Also, when compared "B2" and the detection distance KL of the coordinate of peripheries thereof, the difference of the detection distance KL exceeds the distance threshold, and thus "B2" is determined as the isolated point.

Regarding the detection distance KL in the second distance data DT2 illustrated in FIG. 17B, "B2" is 1 m, and the detection distance KL of "B1" adjacent to "B2" is 4 m, and the other coordinates are 10 m to 13 m. In the second distance data DT2, a difference between the detection distances KL of "B2" and "B1" exceeds the distance threshold, and thus "B2" and "B1" are determined as the isolated point.

Figure 18A:
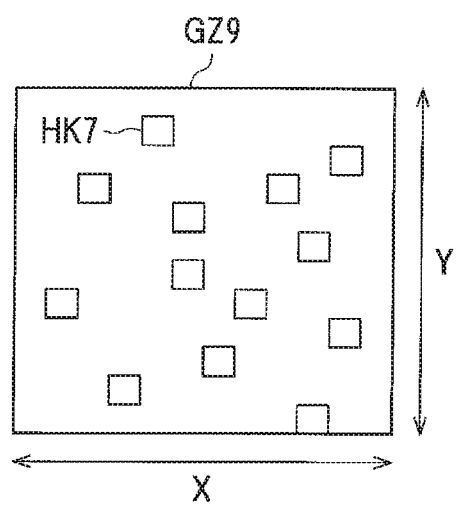
FIG. 18A is an explanatory diagram illustrating a ninth detection image generated by a detection image generation unit.
Figure 18B:
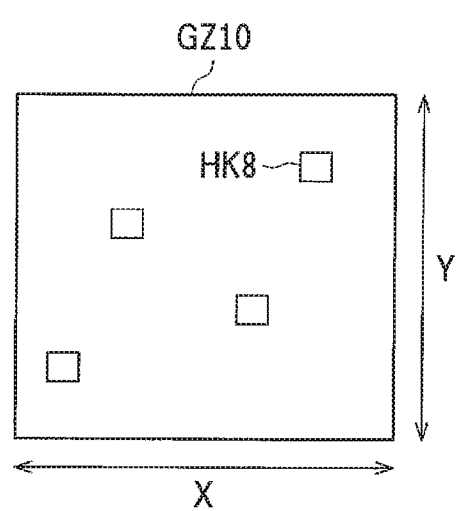
FIG. 18B is an explanatory diagram illustrating a tenth detection image generated by the detection image generation unit.

FIG. 18A is an explanatory diagram illustrating a ninth detection image generated by the detection image generation unit, and FIG. 18B is an explanatory diagram illustrating a tenth detection image generated by the detection image generation unit.

The detection image generation unit 30a generates a detection image in which isolated points are illustrated as reflection points. That is, in image data, a pixel corresponding to the isolated point is illustrated as "1", and the other pixels are illustrated as "0". Specifically, in a ninth detection image GZ9 illustrated in FIG. 18A, the reflection points HK7 are discretely positioned in the ninth detection image GZ9, and the number thereof is "13". In addition, in a tenth detection image GZ10 illustrated in FIG. 18B, the reflection points HK8 are discretely positioned in the tenth detection image GZ10, and the number thereof is "4". In the rainfall determination, an isolated point threshold relating to the number of the isolated points is set in advance, and in the embodiment, the isolated point threshold is set to "10". That is, in the ninth detection image GZ9, the number of the reflection points HK7 (isolated points) exceeds the isolated point threshold, and thus it is determined that a region is in the rainfall state, and in the tenth detection image GZ10, the number of the reflection points HK8 exceeds the isolated point threshold, and thus it is determined that the region is not in the rainfall state. Also, the distance threshold and the isolated point threshold may be appropriately set.

Next, a process flow of the obstacle detection method in the sixth embodiment will be described with reference to drawings. A rainfall determination process in the sixth embodiment is different from that of the first embodiment, but the other processes thereof are the same as that of the first embodiment. That is, in the sixth embodiment, the process flow illustrated in FIG. 5 described above is executed, and in Step S102, a rainfall determination process 3 to be described later is executed.

Figure 19:
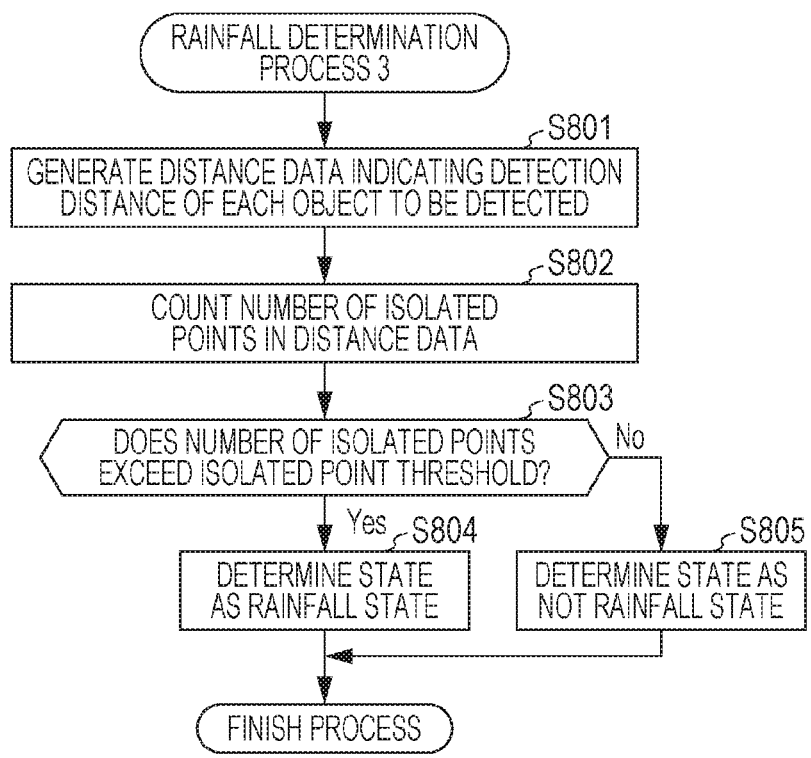
FIG. 19 is a flow chart illustrating a process flow of a rainfall determination process 3 according to the third embodiment of the invention.

FIG. 19 is a flow chart illustrating a process flow of the rainfall determination process 3 according to the third embodiment of the invention.

In Step S801, the detection image generation unit 30a generates the distance data (for example, first distance data DT1 and second distance data DT2) indicating the detection distance KL to each of the objects to be detected 50.

In Step S802, the rainfall determination unit 30b counts the number of the isolated points in the distance data. The isolated points are determined on the basis of the distance threshold. Here, the isolated points in the distance data may be counted, and the reflection points of the detection image corresponding to the distance data may be counted.

In Step S803, the rainfall determination unit 30b determines whether or not the number of the isolated points exceeds an isolated point threshold. As a result, in a case where the number of the isolated points exceeds the isolated point threshold (Yes in Step S803), a procedure goes to Step S804. Meanwhile, in a case where the number of the isolated points does not exceed the isolated point threshold (No in Step S803), the procedure goes to Step S805.

In Step S804, the rainfall determination unit 30b determines that the region is in the rainfall state, and finishes the rainfall determination process 3.

In Step S805, the rainfall determination unit 30b determines that the region is not in the rainfall state, and finishes the rainfall determination process 3.

As described above, it can be determined whether or not obstacles are the raindrops 52 discretely positioned by comparing each other based on the detection distance KL. In addition, even in a case where the objects to be detected 50 are locally focused on such as the obstacle 51 is present, it is possible to understand the difference of the detection distance KL without being affected by statistical bias.

Seventh Embodiment

Next, an obstacle detection device and a moving body according to a seventh embodiment of the invention will be described with reference to drawings. Also, since the seventh embodiment is substantially same as the first embodiment, an exterior view or a configuration diagram thereof will be omitted, and the same numeral is given to a configuration component having a function substantially same as that of the first embodiment to the sixth embodiment so that description thereof will be omitted.

Figure 20A:
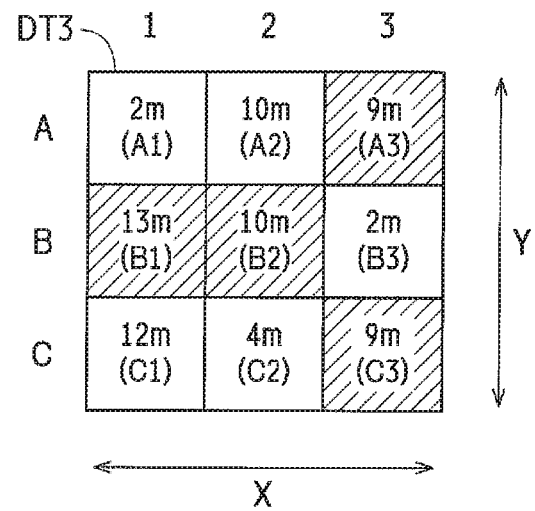
FIG. 20A is an explanatory diagram illustrating third distance data of a first frame.
Figure 20B:
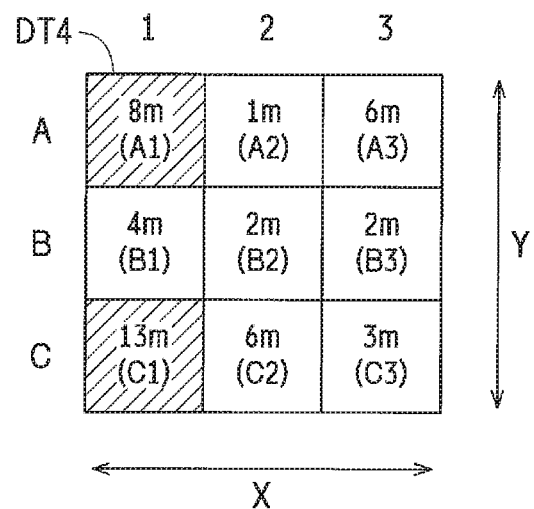
FIG. 20B is an explanatory diagram illustrating fourth distance data of a second frame.
Figure 20C:
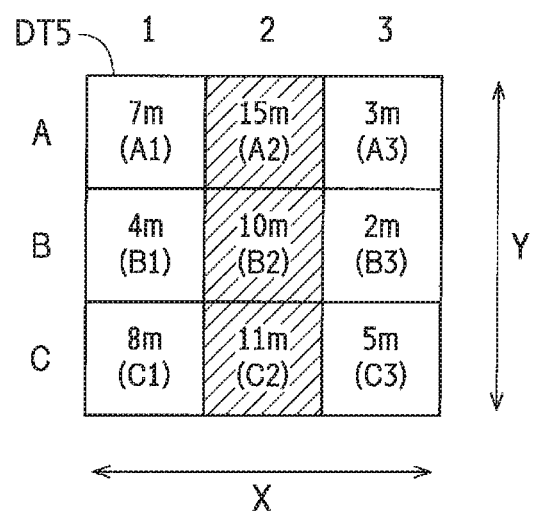
FIG. 20C is an explanatory diagram illustrating fifth distance data of a third frame.
Figure 20D:
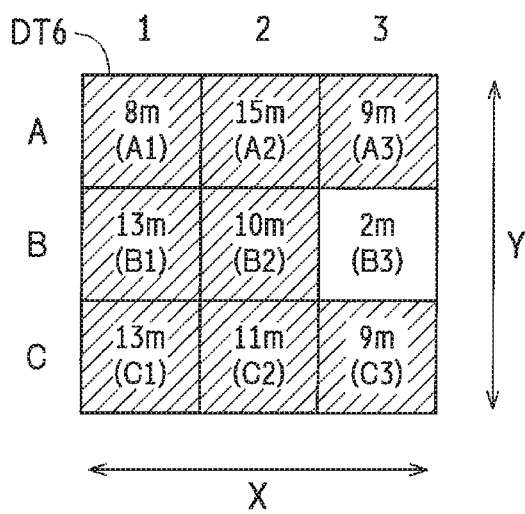
FIG. 20D is an explanatory diagram illustrating sixth distance data in which a maximum value of a detection distance is acquired.

FIG. 20A is an explanatory diagram illustrating third distance data in a first frame, FIG. 20B is an explanatory diagram illustrating fourth distance data in a second frame, FIG. 20C is an explanatory diagram illustrating fifth distance data in a third frame, and FIG. 20D is an explanatory diagram illustrating sixth distance data in which a maximum value of a detection distance is acquired. Also, in FIG. 20A to FIG. 20D, in order to highlight a part, the part is illustrated by hatching.

In the seventh embodiment, a method used for a rain removal process is different from the method of the first embodiment. In the seventh embodiment, the rain removal processing unit 30c compares the detection distances KL of each of the plurality of generation cycles SC with each other, and removes the isolated points from the detection image. In the embodiment, with respect to a frame in which the detection image is generated, the detection distances KL are compared in three frames including before one frame and two frames. Also, in order to describe later, three continuous frames are respectively referred to as a first frame, a second frame, and a third frame as time elapses.

A third distance data DT3, a fourth distance data DT4, and a fifth distance data DT5 are respectively a part of distance data corresponding to detection images in the first frame, the second frame, and the third frame, and are a matrix of "3×3" in the same manner as the first distance data DT1. Also, the third distance data DT3, the fourth distance data DT4, and the fifth distance data DT5 indicate the same coordinate in the detection range KH.

Regarding the detection distances KL of the third distance data DT3, "A1" is 2 m, "A2" is 10 m, "A3" is 9 m, "B1" is 13 m, "B2" is 10 m, "B3" is 2 m, "C1" is 12 m, "C2" is 4 m, and "C3" is 9 m.

Regarding the detection distances KL of the fourth distance data DT4, "A1" is 8 m, "A2" is 1 m, "A3" is 6 m, "B1" is 4 m, "B2" is 2 m, "B3" is 2 m, "C1" is 13 m, "C2" is 6 m, and "C3" is 3 m.

Regarding the detection distances KL of the fifth distance data DT5, "A1" is 7 m, "A2" is 15 m, "A3" is 3 m, "B1" is 4 m, "B2" is 10 m, "B3" is 2 m, "C1" is 8 m, "C2" is 11 m, and "C3" is 5 m.

In the rain removal process, the detection distance KL which becomes maximized at each of the measurement points is acquired, and a maximum value data indicating a maximum value of each of the measurement points is generated. For example, in a case of "A1", 8 m of the fourth distance data DT4 is acquired as the maximum value. The maximum value is also acquired in the other coordinates, and sixth distance data DT6 illustrated in FIG. 20D is generated as the maximum value data of the third distance data DT3, the fourth distance data DT4, and the fifth distance data DT5.

Regarding the detection distances KL of the sixth distance data DT6, "A1" is 8 m, "A2" is 15 m, "A3" is 9 m, "B1" is 13 m, "B2" is 10 m, "B3" is 2 m, "C1" is 13 m, "C2" is 11 m, and "C3" is 9 m.

In a case where the obstacle determination is performed on the maximum value data generated as described above, it may be determined whether or not reflection points are present based on a threshold relating to the detection distances KL which is set in advance. For example, in a case where the threshold is 5 m, in the sixth distance data DT6, it is determined that "B3" is the reflection point corresponding to the object to be detected 50. Also, the number of the reflection points and the obstacle threshold in the distance data are compared, and it is determined that the object to be detected 50 is the obstacle 51.

Regarding the detection distances of the third distance data DT3 to the fifth distance data DT5, other than "B3", a coordinate smaller than the threshold is also present, and thus both the obstacle 51 and the raindrop 52 cannot be discriminated. However, when compared to other frames, the detection distance KL is changed. With respect to this, "B3" is 2 m in any one of the frames, and the detection distance KL is not changed. Accordingly, when the detection distances KL of each of the generation cycles SC are compared and each object is positioned at the same location, the raindrops 52 which are moved at a high speed can be discriminated. The maximum value of the detection distance KL is acquired from the coordinate in which the raindrops 52 and the like are present, and thus noise interfering with the obstacle detection can be removed. In addition, this process using a simple calculation of comparing the detection distances KL is executed, and the process can be accelerated.

Next, a process flow of the obstacle detection method in the seventh embodiment will be described with reference to the drawing. In the seventh embodiment, a rain removing determination process is different from that of the first embodiment, but the others are processed in the same manner. That is, in the seventh embodiment, the process flow illustrated in FIG. 5 described above is executed, and the rain removal process 2 as follow is executed in Step S105.

Figure 21:
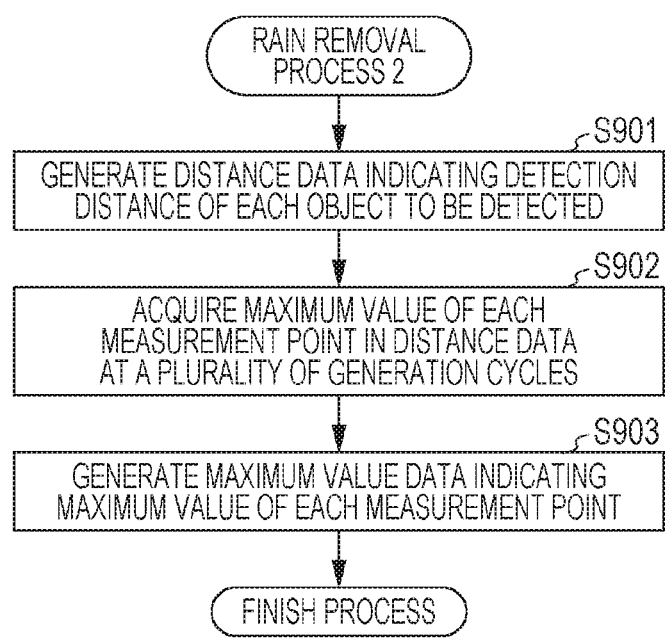
FIG. 21 is a flow chart illustrating a process flow of a rain removal process 2 according to a seventh embodiment of the invention.

FIG. 21 is a flow chart illustrating a process flow of the rain removal process 2 according to the seventh embodiment of the invention.

In Step S901, the detection image generation unit 30a generates the distance data (for example, third distance data DT3 to fifth distance data DT5) indicating the detection distance KL to each of the objects to be detected 50. Also, only the distance data of the frame in which the rain removal process is executed is generated, and the generated distance data may be stored. That is, the distance data in a previous frame may be referred to the stored distance data.

In Step S902, the rain removal processing unit 30c acquires the maximum value of each of the measurement points in the distance data at the plurality of generation cycles SC. In the embodiment, the maximum value of three frames is acquired, but it is not limited thereto, and the number of frames to be compared may be appropriately set.

In Step S903, the rain removal processing unit 30c generates the maximum value data (for example, sixth distance data DT6) indicating the maximum value of each of the measurement points, and finishes the process. Next obstacle determination is executed on the maximum value data as a target.

In the sixth embodiment and the seventh embodiment, the process flow illustrated in FIG. 5 is executed, but it is not limited thereto, the process flow illustrated in FIG. 13 or FIG. 15 is executed, and the rainfall determination may be performed in each of the plurality of frames.

Also, the embodiment described herein is an example in view of all aspects, and it is not a basis for limited interpretation. Accordingly, a technical scope of the invention is not interpreted by only the above described embodiment, and defined based on description of claims. In addition, meanings equivalent to claims and all changes in a range of claims are included.

Also, this application claims a priority based on Japanese Unexamined Patent Application Publication No. 2015-014074 filed on Jan. 28, 2015 in Japan. Contents thereof are referred so as to be incorporated in this application. In addition, documents cited in this specification are referred, and thus the entirety thereof is specifically incorporated.

REFERENCE SIGNS LIST

1 MOVING BODY
10 OBSTACLE DETECTION DEVICE
11 DISTANCE MEASUREMENT SENSOR
20 DRIVE UNIT
30 CPU
30a DETECTION IMAGE GENERATION UNIT
30b RAINFALL DETERMINATION UNIT
30c RAIN REMOVAL PROCESSING UNIT
30d OBSTACLE DETERMINATION UNIT
30e TRAVELING CONTROL UNIT
50 OBJECT TO BE DETECTED
51 OBSTACLE
52 RAINDROP
100 TRAVELING SURFACE
KL DETECTION DISTANCE
KH DETECTION RANGE

The invention claimed is:

1. An obstacle detection device comprising:
a distance measurement sensor that emits a detection wave to an object to be detected, receives a reflection wave from the object to be detected, and measures a detection distance to the object to be detected;
a detection image generation unit that:
  generates a detection image indicating a presence of the object to be detected in a detection range where the detection wave is emitted based on a result of measurement by the distance measurement sensor; and
  disposes an image of the object to be detected, in the detection image, as a reflection point at a coordinate corresponding to a position of the image of the object to be detected;
a rainfall determination unit that performs a rainfall determination of whether or not a region in the detection range is in a rainfall state, based on a presence of isolated points, each of which is the reflection point discretely positioned and discriminated as one of the isolated points, among the objects to be detected in the detection image;

a rain removal processing unit that executes a rain removal process by performing a calculation to remove the isolated points discriminated by the rainfall determination unit from the detection image; and an obstacle determination unit that performs an obstacle determination of whether or not the object to be detected is an obstacle based on the detection image, wherein, in a case where the rainfall determination unit determines that a region is in the rainfall state, the obstacle determination unit executes the obstacle determination based on the detection image on which the rain removal process is executed by the rain removal processing unit.

2. The obstacle detection device according to claim 1, wherein the detection range is set to a three-dimensional space, wherein the detection image generation unit generates a three-dimensional image corresponding to the detection range, which is set to the three-dimensional space, as the detection image, and wherein the rainfall determination unit performs the rainfall determination on the three-dimensional image.

3. The obstacle detection device according to claim 1, wherein the rainfall determination unit calculates a dispersion value of the object to be detected in the detection image at the time of the rainfall determination.

4. The obstacle detection device according to claim 1, wherein the rainfall determination unit calculates a difference between peripheries of the object to be detected in the detection image and the detection distance thereof at the time of the rainfall determination.

5. The obstacle detection device according to claim 1, wherein the detection image generation unit periodically generates the detection image at each generation cycle set in advance.

6. The obstacle detection device according to claim 1, wherein the rain removal processing unit executes the rain removal process using a median filter.

7. The obstacle detection device according to claim 1, wherein the rainfall determination unit performs the rainfall determination by comparing the detection image and a median process image in which the isolated point is removed from the detection image using the median filter.

8. The obstacle detection device according to claim 5, wherein the rainfall determination unit performs the rainfall determination by comparing two detection images generated at different generation cycles.

9. The obstacle detection device according to claim 5, wherein the rainfall determination unit performs the rainfall determination at each of a plurality of generation cycles.

10. The obstacle detection device according to claim 5, wherein the rainfall determination unit performs the rainfall determination at a plurality of generation cycles, and outputs a result of the rainfall determination, at the time of continuously making the same determination many times.

11. The obstacle detection device according to claim 5, wherein the rain removal processing unit removes the isolated point from the detection image by comparing the detection distances at each of a plurality of generation cycles.

12. A moving body comprising:
the obstacle detection device according to claim 1,
wherein the moving body travels on a traveling surface.

13. The moving body according to claim 12, further comprising:
a traveling control unit that controls a traveling speed at which the moving body travels on the traveling surface,
wherein the traveling control unit performs control such that the traveling speed is reduced, in a case where the rainfall determination unit determines that a region is in the rainfall state.

14. An obstacle detection device comprising:
a distance measurement sensor that emits a detection wave to an object to be detected, receives a reflection wave from the object to be detected, and measures a detection distance to the object to be detected;
a detection image generation unit that generates a detection image indicating a presence of the object to be detected in a detection range where the detection wave is emitted based on a result of measurement by the distance measurement sensor;
a rainfall determination unit that performs a rainfall determination of whether or not a region in the detection range is in a rainfall state, based on a presence of isolated points, which are discretely positioned, among the objects to be detected in the detection image;
a rain removal processing unit that executes a rain removal process for removing the isolated points from the detection image; and
an obstacle determination unit that performs an obstacle determination of whether or not the object to be detected is an obstacle based on the detection image,
wherein the rainfall determination unit:
 calculates a difference between peripheries of the object to be detected in the detection image and the detection distance thereof at a time of the rainfall determination;
 sets, as one of the isolated points, a measurement point of which the difference is large; and
 determines whether or not it is raining based on the number of the isolated points, and
wherein, in a case where the rainfall determination unit determines that a region is in the rainfall state, the obstacle determination unit executes the obstacle determination based on the detection image on which the rain removal process is executed by the rain removal processing unit.

15. A moving body comprising:
the obstacle detection device according to claim 14,
wherein the moving body travels on a traveling surface.

16. An obstacle detection device comprising:
a distance measurement sensor that emits a detection wave to an object to be detected, receives a reflection wave from the object to be detected, and measures a detection distance to the object to be detected;
a detection image generation unit that generates a detection image indicating a presence of the object to be detected in a detection range where the detection wave is emitted based on a result of measurement by the distance measurement sensor;
a rainfall determination unit that performs a rainfall determination of whether or not a region in the detection range is in a rainfall state, based on a presence of isolated points, which are discretely positioned, among the objects to be detected in the detection image;

a rain removal processing unit that executes a rain removal process for removing the isolated points from the detection image; and an obstacle determination unit that performs an obstacle determination of whether or not the object to be detected is an obstacle based on the detection image, wherein the detection image generation unit periodically generates the detection image at each generation cycle set in advance, wherein the rainfall determination unit performs the rainfall determination by comparing two detection images generated at different generation cycles, and wherein, in a case where the rainfall determination unit determines that a region is in the rainfall state, the obstacle determination unit executes the obstacle determination based on the detection image on which the rain removal process is executed by the rain removal processing unit.

17. A moving body comprising:
the obstacle detection device according to claim 16,
wherein the moving body travels on a traveling surface.

* * * * *